US007580566B2

(12) United States Patent
Fukuda et al.

(10) Patent No.: US 7,580,566 B2
(45) Date of Patent: Aug. 25, 2009

(54) IMAGE PROCESSING DEVICE, IMAGE PROCESSING METHOD, STORAGE MEDIUM, AND PROGRAM

(75) Inventors: Yasuo Fukuda, Ohta-ku (JP); Takeshi Makita, Ohta-ku (JP); Osamu Yamada, Ohta-ku (JP); Takahiro Matsuura, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 637 days.

(21) Appl. No.: 10/766,995

(22) Filed: Jan. 28, 2004

(65) Prior Publication Data

US 2004/0184671 A1 Sep. 23, 2004

(30) Foreign Application Priority Data

Jan. 31, 2003 (JP) .............................. 2003/023826

(51) Int. Cl.
*G06K 9/00* (2006.01)
*G06K 9/40* (2006.01)

(52) U.S. Cl. .................... 382/168; 382/274; 382/162; 382/118

(58) Field of Classification Search ................ 382/169, 382/163, 274, 168, 167, 162, 118
See application file for complete search history.

(56) References Cited

U.S. PATENT DOCUMENTS

| 5,194,946 | A | * | 3/1993 | Morikawa et al. | ........... 358/505 |
| 5,684,509 | A | | 11/1997 | Hatanaka et al. | |
| 5,715,325 | A | * | 2/1998 | Bang et al. | .................. 382/118 |
| 5,760,831 | A | * | 6/1998 | Tanaka et al. | ............ 348/223.1 |
| 5,953,134 | A | * | 9/1999 | Sato et al. | ................... 358/488 |
| 6,460,127 | B1 | * | 10/2002 | Akerib | ........................ 712/10 |
| 6,493,468 | B1 | * | 12/2002 | Matsuura | .................... 382/274 |
| 7,068,328 | B1 | | 6/2006 | Mino | |
| 2001/0052928 | A1 | * | 12/2001 | Imagawa et al. | ......... 348/14.12 |
| 2002/0006230 | A1 | * | 1/2002 | Enomoto | .................... 382/261 |
| 2002/0012463 | A1 | * | 1/2002 | Yamada | ..................... 382/167 |
| 2002/0075465 | A1 | * | 6/2002 | Nakamura et al. | ........... 355/40 |
| 2002/0081032 | A1 | | 6/2002 | Chen et al. | .................. 382/199 |
| 2004/0234153 | A1 | * | 11/2004 | Nakami | ..................... 382/254 |

FOREIGN PATENT DOCUMENTS

| JP | 05-250462 A | | 9/1993 |
| JP | 07-182522 A | | 7/1995 |
| JP | 2000-270222 | * | 3/1999 |
| JP | 11-317959 | | 11/1999 |
| JP | 2000-196890 A | | 7/2000 |
| JP | 2000-261650 A | | 9/2000 |
| JP | 2000-270222 A | | 9/2000 |
| JP | 2001-126075 A | | 5/2001 |
| JP | 2001-184503 A | | 7/2001 |
| JP | 2002-185793 A | | 6/2002 |
| JP | 2002-199221 A | | 7/2002 |
| JP | 2002-290707 A | | 10/2002 |
| JP | 2003-016445 A | | 1/2003 |

OTHER PUBLICATIONS

U.S. Appl. No. 09/317,844, Canon, Inc.

* cited by examiner

*Primary Examiner*—John B Strege
(74) *Attorney, Agent, or Firm*—Canon U.S.A. Inc., I.P. Division

(57) ABSTRACT

An image processing device for performing image correction of a scene by detecting whether a specific object is included in an input image of the scene, and that sets a correction parameter based on the detection result to correct the input image.

5 Claims, 24 Drawing Sheets

LUTs FOR COLOR FOGGING CORRECTION AND CONTRAST CORRECTION

LUT FOR EXPOSURE CORRECTION

LUTs FOR COLOR FOGGING CORRECTION AND CONTRAST CORRECTION

LUT FOR EXPOSURE CORRECTION

FIG. 20

| PIXELS | R VALUES | G VALUES | B VALUES |
|---|---|---|---|
| IMG[0] | ## | ## | ## |
| IMG[1] | ## | ## | ## |
| IMG[2] | ## | ## | ## |
| IMG[3] | ## | ## | ## |
| IMG[4] | ## | ## | ## |
| IMG[5] | ## | ## | ## |
| IMG[6] | ## | ## | ## |
| IMG[7] | ## | ## | ## |
| : | | | |
| IMG[n] | ## | ## | ## |
| : | | | |

IMAGE DATA

PHOTOGRAPHING INFORMATION:

| ### |
|---|
| POSTURE OF CAMERA DURING PHOTOGRAPHING |

| ### |
|---|
| FLASH USAGE INFORMATION |

| ### |
|---|
| FOCAL LENGTH |

| ### |
|---|
| IN-FOCUS POSITION |

| ### |
|---|
| INPUT DEVICE ID |

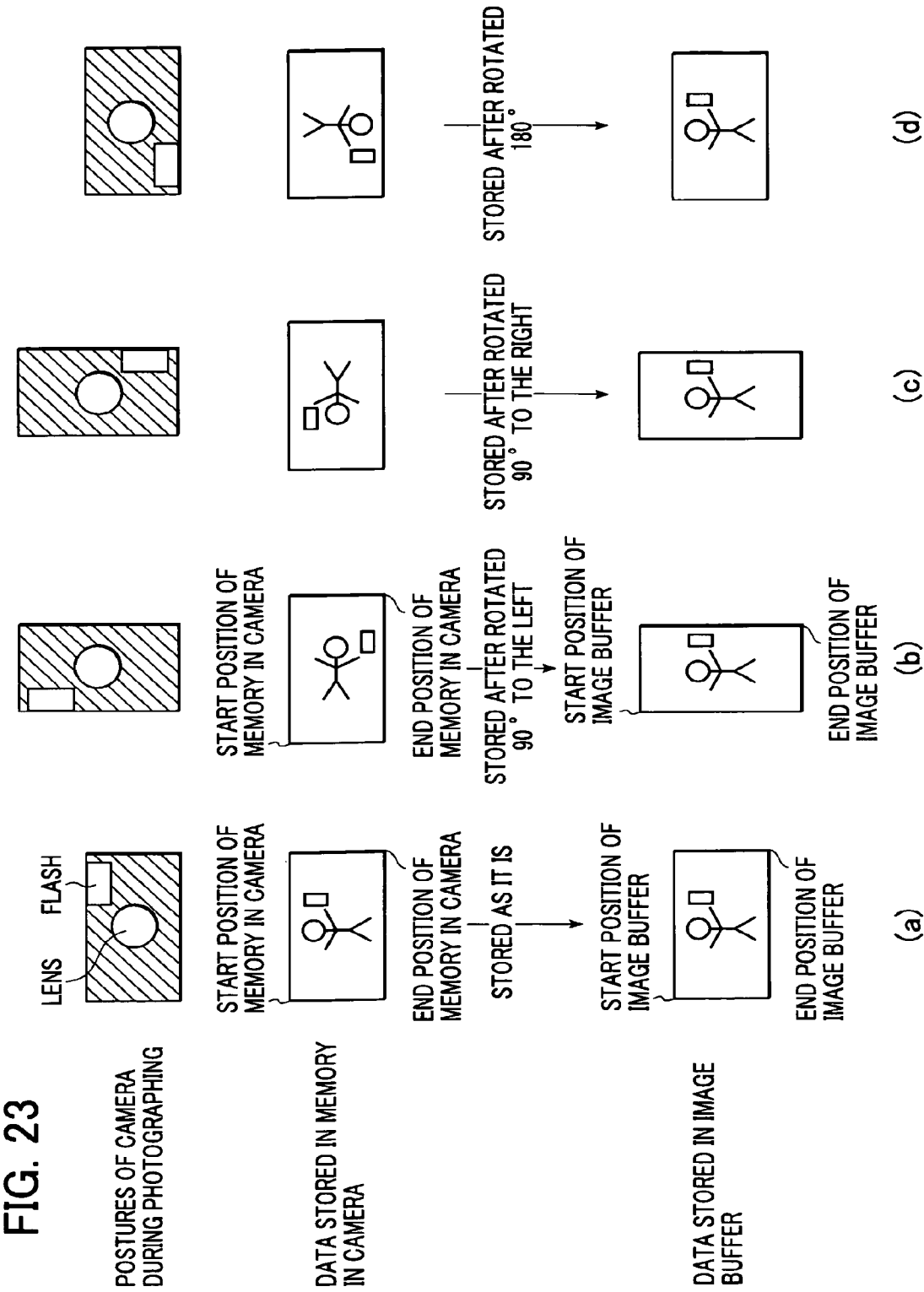

DIFFERENCE IN LUMINANCE BETWEEN TWO REGIONS, AND SIZES OF THE TWO REGIONS ARE CHECKED

ANGLE WITH RESPECT TO HORIZON IS CHECKED

DISTANCE IS CHECKED

DARK REGION OBTAINED AT STEP S61

RECTANGULAR REGION IS CREATED

EDGE AND COLOR INFORMATION, ARE DETERMINED IN RECTANGULAR REGION

FIG. 26

|  |  | IN-FOCUS POSITION | | |
|---|---|---|---|---|
|  |  | SHORT DISTANCE | INTERMEDIATE DISTANCE | LONG DISTANCE |
| FLASH | USED | HP = ## <br> SP = ## | HP = ## <br> SP = ## | HP = ## <br> SP = ## |
|  | NOT USED | HP = ## <br> SP = ## | HP = ## <br> SP = ## | HP = ## <br> SP = ## |

IMAGE PROCESSING DEVICE, IMAGE PROCESSING METHOD, STORAGE MEDIUM, AND PROGRAM

BACKGROUND OF THE INVENTION

1. Field of the Invention

The present invention relates to an image processing device, image processing method, storage medium, and program for correcting images.

2. Description of the Related Art

Various methods have been disclosed, which relate to an algorithm for correcting contrast, highlight, shadow, or white balance of a digital camera image.

Japanese Patent Laid-Open No. 11-317959 (U.S. Pat. No. 6,493,468) by the same inventor as this application discloses a method in which image features are determined by the ratio of uneven distribution of color components in a highlight portion of the image, and in which, based on the determination result, the degree of white balance correction, contrast, highlight, and shadow are optimally corrected to reproduce the color of an object.

In the above-described conventional example, however, the image features are determined from histograms of an overall image, and a correction is performed by using one and the same correction method irrespective of whether the scene is of a person's image or a landscape image. In general, the desired degree of contrast enhancement is different between personal images and landscape images.

SUMMARY OF THE INVENTION

Accordingly, it is an object of the present invention to solve the above-described problem, and to provide an image processing device capable of changing a correction method in response to whether a specific object is included in an input image.

It is another object of the present invention to provide an image correcting unit that, when the specific object is a person, performs a corresponding image correction.

In order to achieve these objects, the present invention provides an image processing device that includes a detector for detecting whether an input image includes a specific object; a setting unit for setting a correction parameter based on the above-described detection result; and a correcting unit for correcting the input image by using the set correction parameter.

In a further aspect, an image processing method is disclosed, which comprises the steps of creating a histogram of an input image, and then using the histogram to set a first gradation correcting condition. The first gradation correcting condition is then used to correct the input image, after which, a specific object region is extracted from the corrected input image.

The image processing method further includes the steps of creating a histogram of the extracted specific object region, and then using this histogram to set a second gradation correcting condition. Thereafter, the image in the specific object region is corrected by using the set second gradation correcting condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 20 is a table showing examples of photographic information and image data stored in an image buffer 9 in the first embodiment.

FIGS. 23A to 23D are representations of relationship between the posture of a digital camera during photographing and the data developing method in the image buffer 9.

FIG. 26 is a table showing information held in a corrected information holding section 15 in the second embodiment.

DESCRIPTION OF THE PREFERRED EMBODIMENTS

First Embodiment

Figure 1:
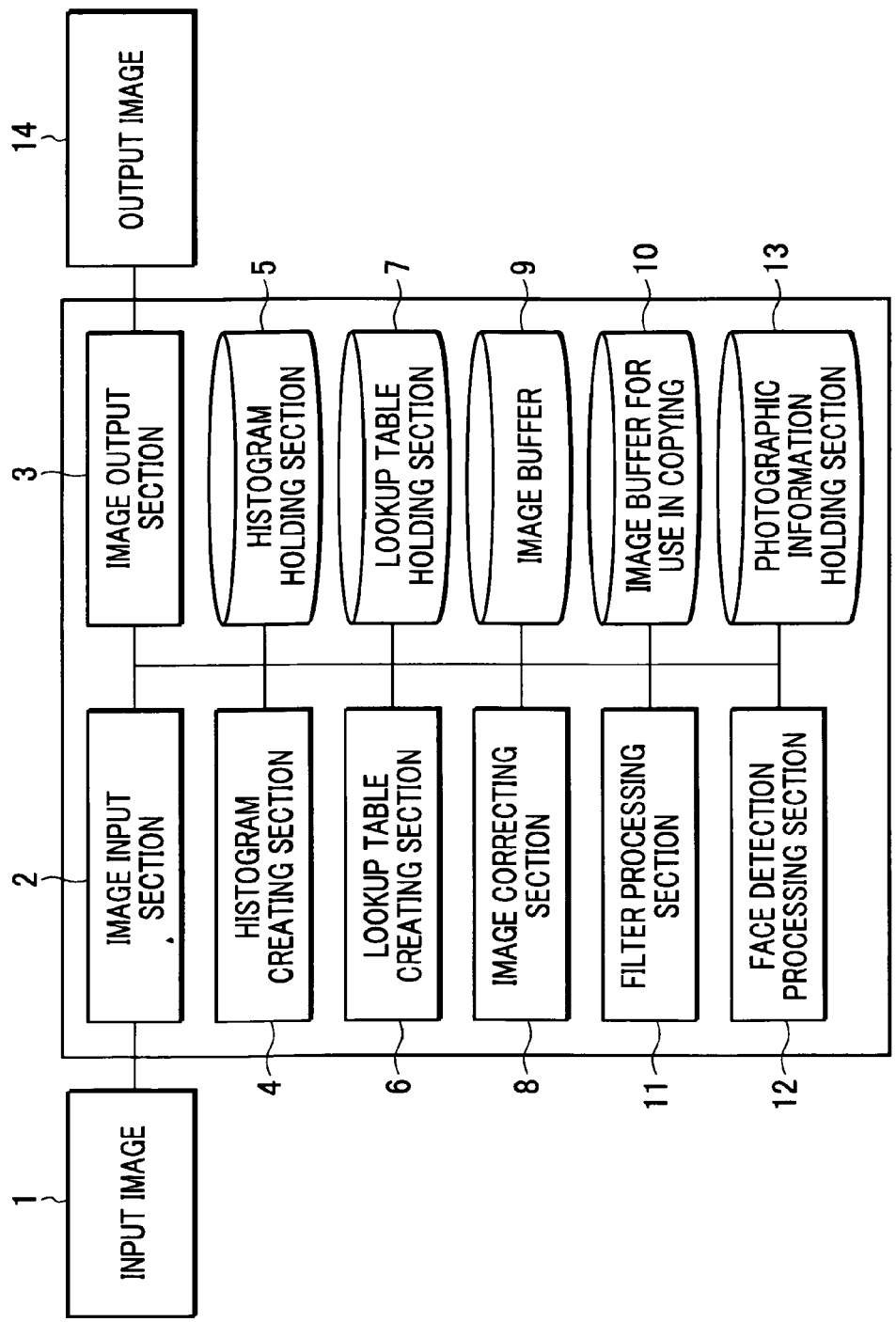
FIG. 1 is a block diagram showing the construction of an image processing device according to a first embodiment of the present invention.

FIG. 1 shows a block diagram of the main section of an image processing device according to a first embodiment of the present invention.

Referring to FIG. 1, this image processing device comprises an image input section 2, image output section 3, histogram creating section 4, histogram holding section 5, lookup table creating section 6, lookup table holding section 7, image correcting section 8, imager buffer 9, image buffer 10 for use in copying, filter processing section 11, face detection processing section 12, and photographic information holding section 13. Here, the image input section 2 reads data from an input image 1, and writes it into the image buffer 9.

The image output section 3 writes data stored in the image buffer 9 into an output image 14. The histogram creating section 4 creates a histogram based on image data stored in the image buffer 9, and stores the created result in the histogram holding section 5.

The histogram holding section 5 holds a histogram of the overall image data and a histogram of a mask region.

The lookup table creating section 6 calculates parameters necessary for correction, based on the histogram stored in histogram holding section 5, and creates a lookup table. In addition, the lookup table creating section 6 synthesizes the aforementioned lookup table and a lookup table for correcting gradation characteristic and color reproducibility, which is held in advance in the lookup table holding section 7. Then, the lookup table creating section 6 stores the synthesized lookup table in the lookup table holding section 7.

Thus, the lookup table holding section 7 holds the lookup tables created in the lookup table creating section 6 and the lookup table for correcting gradation characteristic and color reproducibility.

The image correcting section 8 corrects the image stored in the image buffer 9, based on the lookup table stored in the lookup table holding section 7, and then stores the corrected result in the image buffer 10 for use in copying.

The image buffer 9 and the image buffer 10 are used for copying and holding image data.

The filter processing section 11 performs enlargement/reduction processing, and edge enhancement in a highlight portion.

The face detection processing section 12 detects whether specific objects, such as a human face is present. This detection may be based on the image data stored in the image buffer 9. If a human face is detected, the face detection processing section 12 then creates mask data.

The photographic information holding section 13 holds various types of information such as the camera posture during photography. Other information includes the usage or non-usage of a flash, focal length, and in-focus position (two dimensional), and the like.

The image processing device can be implemented by, for example, supplying a personal computer with a program for achieving processing or control with respect to each of the sections shown in FIG. 1. Then, CPU of the personal computer executes each processing or control, based on contents of the program.

Hereinafter, more detailed descriptions of this embodiment will be made using a concrete example.

Processing Flow in This Embodiment

Figure 2:
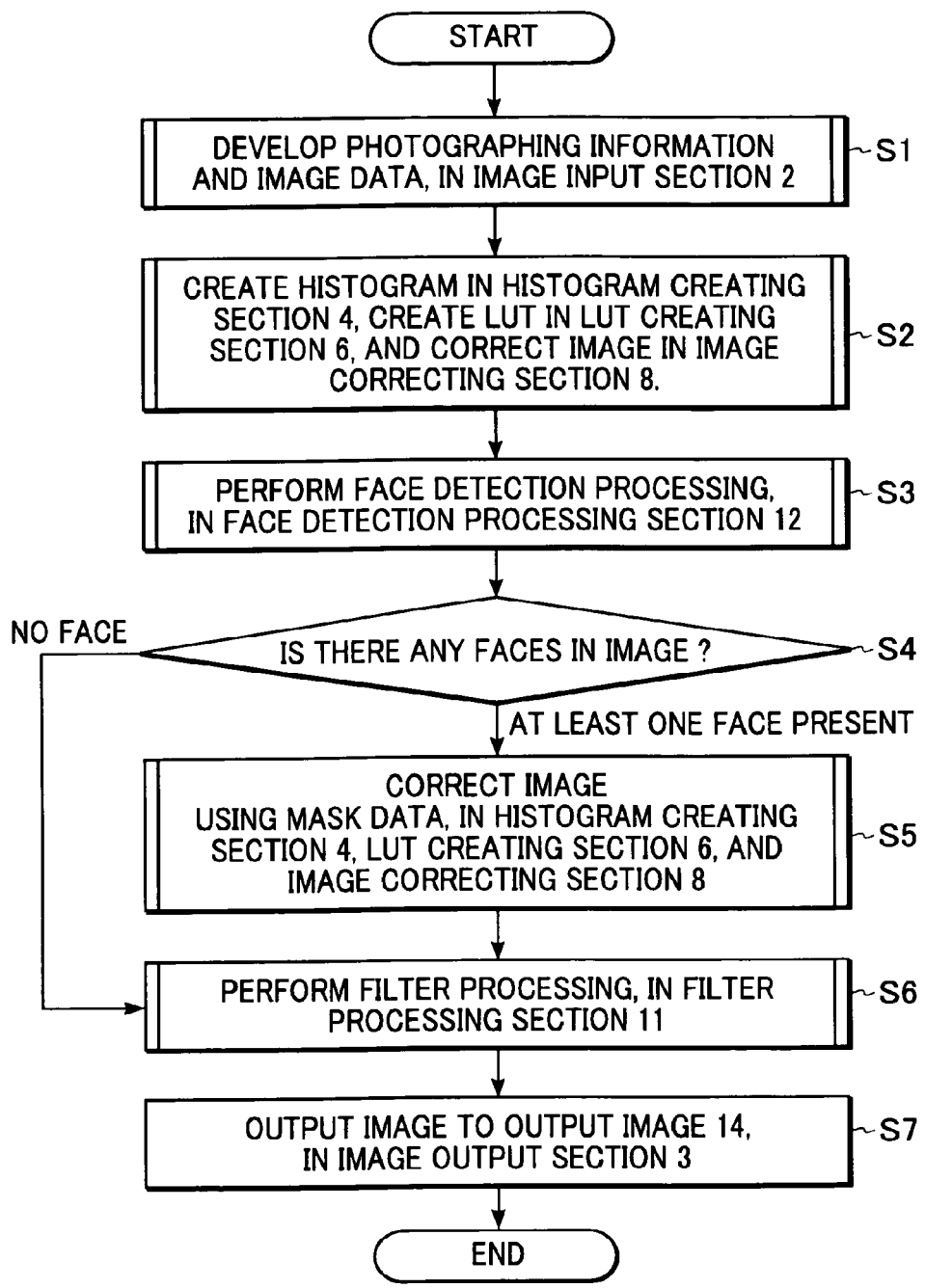
FIG. 2 is a flowchart showing image processing in the first embodiment.

FIG. 2 shows processing flow in this embodiment.

Figure 3:
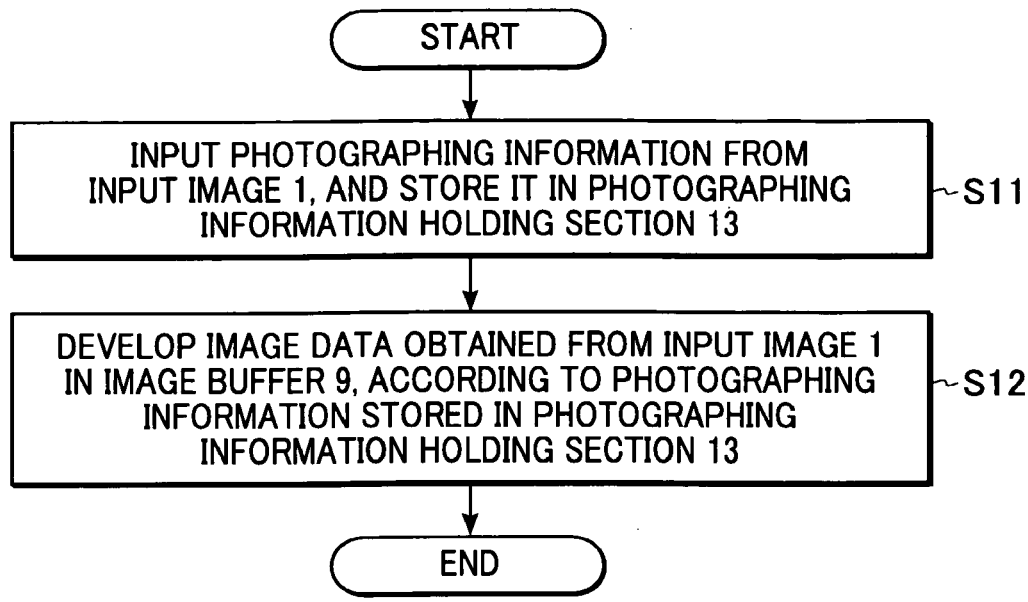
FIG. 3 is a flowchart showing operational process steps associated with an image input section 2 in the first embodiment.

At step S1, in the image input section 2, photographic information and image data of the input image 1 are read, and are developed in the image buffer 9. Operational process steps in the image input section 2 are shown in FIG. 3, and are discussed later.

Figure 4:
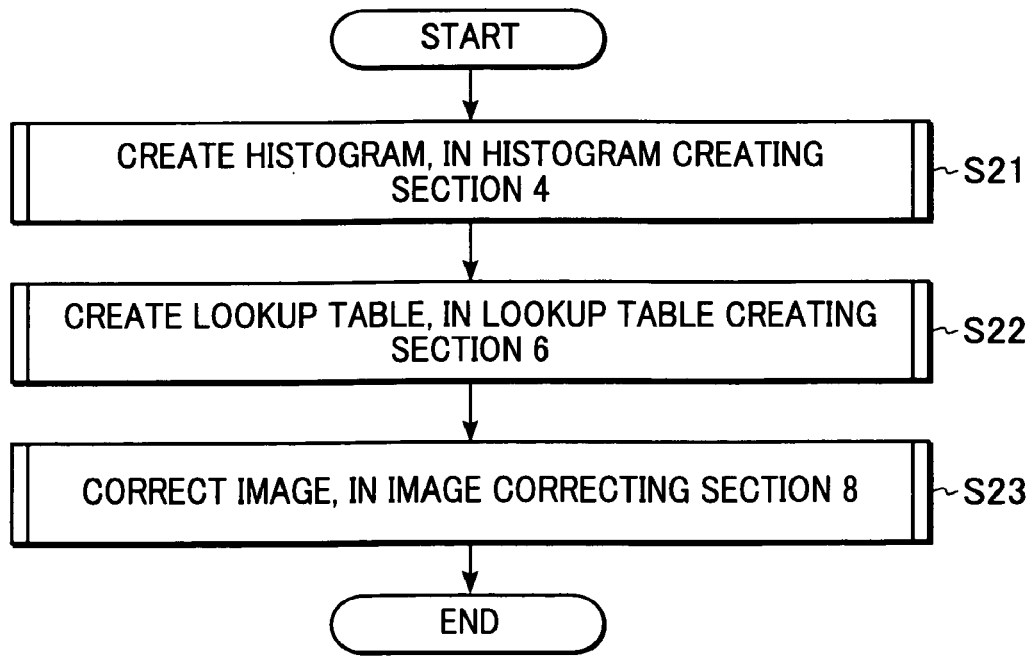
FIG. 4 is a flowchart showing a processing flow of image correction in the first embodiment.

At step S2, in the histogram creating section 4, lookup table creating section 6, and image correcting section 8, an image is corrected. Operational steps in these sections are shown in FIG. 4, and are discussed later.

Figure 13:
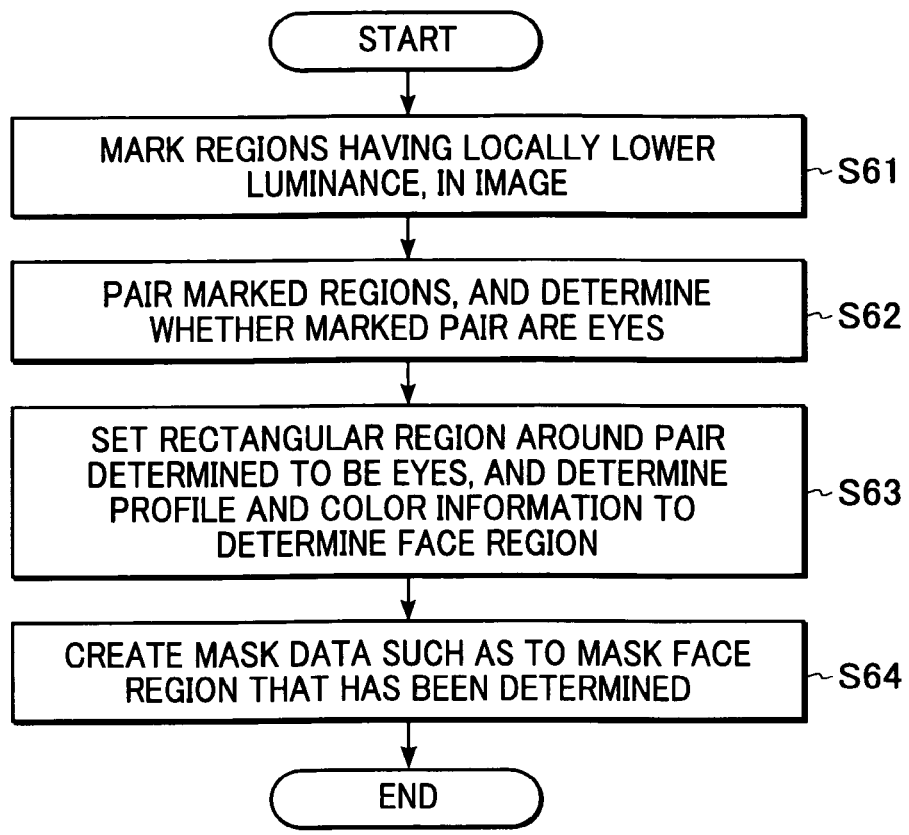
FIG. 13 is a flowchart showing operational process steps in a face detection processing section 12 in the first embodiment.

At step S3, in the face detection processing section 12, face detection processing is performed with respect to the face as the specific object to be detected. Operational process steps in the face detection processing section 12 are shown in FIG. 13, and are discussed later.

At step S4, it is determined whether any faces are presented, based on the result of the face detection processing. If at least one face is present, the processing advances to step S5. If no face is present, the processing advances to step S6.

Figure 14:
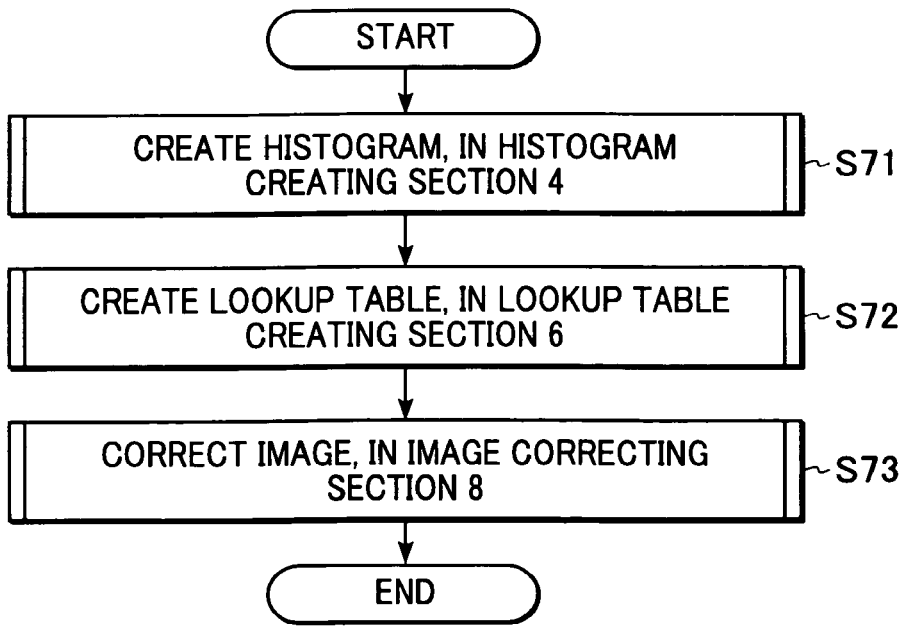
FIG. 14 is a flowchart showing a flow of image correction processing when using mask data in the first embodiment.

At step S5, in the histogram creating section 4, lookup table creating section 6, and image correcting section 8, the image is corrected by using mask data. Operational process steps in these sections are shown in FIG. 14, and are discussed later.

Figure 18:
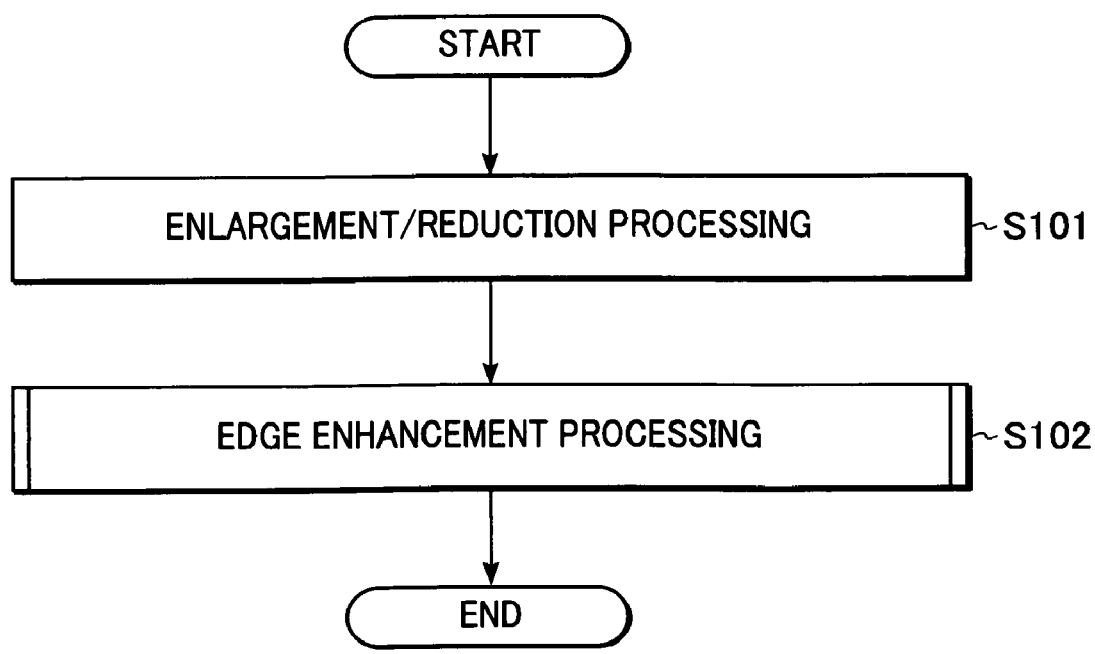
FIG. 18 is a flowchart showing operational process steps in a file processing section 11 in the first embodiment.

At step S6, in the filter processing section 11, filter processing is performed. Operational process steps in the filter processing section 11 are shown in FIG. 18, and are discussed later.

At step S7, in the image output section 3, the image data and photographic information stored in the image buffer 9 are outputted to the output image 14.

Photographic Information and Image Data Stored in Input Image 1

FIG. 20 shows photographic information and image data stored in the input image 1. The photographic information is stored in the photographic information holding section 13, and the image data is stored in the image buffer 9. The image buffer 9 stores mask data in addition to the image data. The photographic information includes information about the posture of a camera (FIG. 23A shows its normal position; four different postures are shown in FIGS. 23A to 23D), the usage or non-usage of a flash, focal lengths, and in-focus positions, an input device (camera) ID and the like.

Method for Developing Image

FIG. 3 shows operational process steps associated with the image input section 2. These are more specific descriptions of step S1 shown in FIG. 2.

At step S11, photographic information is inputted from the input image 1, and is stored in the photographic information holding section 13. An example of photographic information is information specified by the known Exif standard. However, any other information that constitutes information about photographing by a camera or information about image inputting by a scanner, may be used.

At step S12, the posture of a camera during photographing that is stored in the photographic information holding section 13 is determined, and in accordance with the determination result, the image data obtained from the input image 1 is developed in the image buffer 9.

When the posture of the camera is as shown in FIG. 23A, the image data is developed in the image buffer as it is. When its posture is as FIG. 23B, the image data is developed after it is rotated 90° to the left; when its posture is as shown in FIG. 23C, the image data is developed after a 90° rotation to the right; and when its posture is as FIG. 23D, the image data is developed after a 180° rotation, whereby the image data is developed in the image buffer so that an up-and-down direction conforms to that in the case shown in FIG. 23A. Thereby, when performing later face detection processing, it is possible to treat a person as being always at a normal position irrespective of the posture of the camera during photography.

During development, processing for reducing dark noise peculiar to a digital camera is also performed. This processing may include a treatment such as smoothing an image in, for example, portions where the luminance thereof is low and delicately fluctuates.

Image Correction Processing

FIG. 4 shows a flow of image correction processing.

Figure 5:
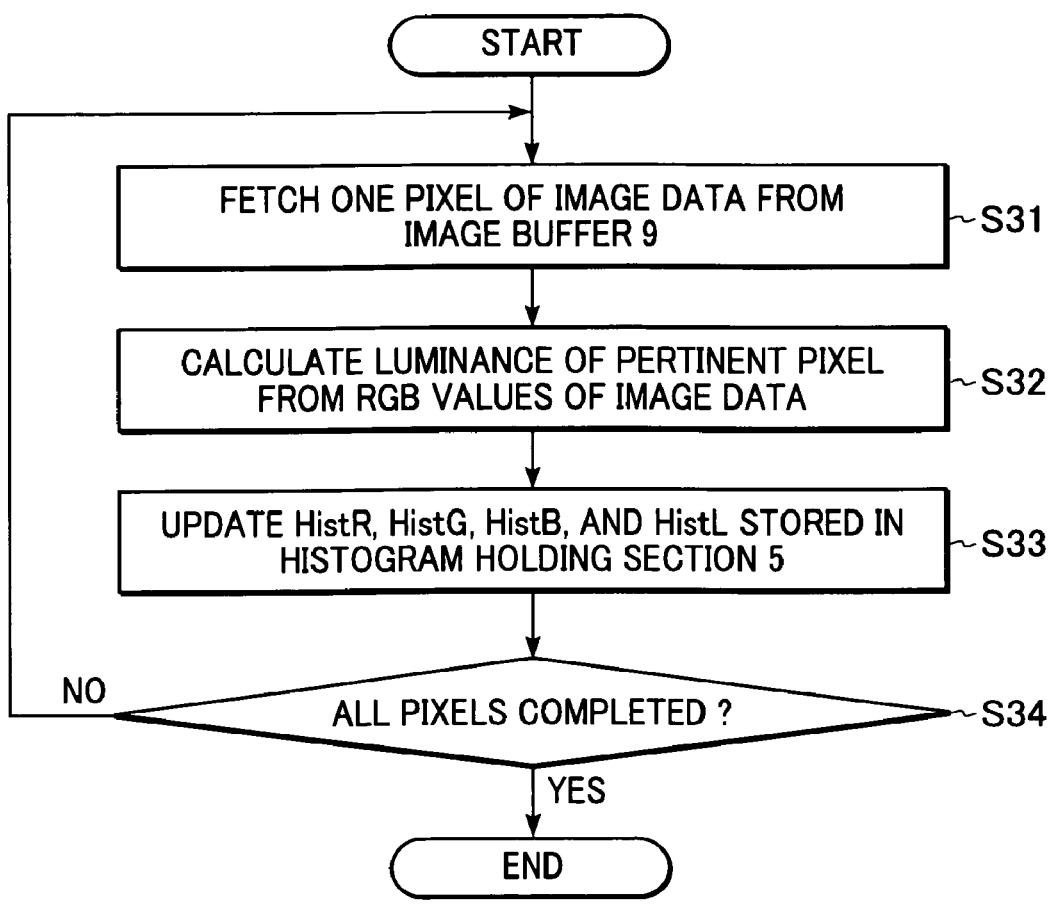
FIG. 5 is a flowchart showing operational process steps associated with a histogram creating section 4 in the first embodiment.

At step 21, in the histogram creating section 4, a histogram is created based on the image data stored in the image buffer 9, and the obtained result is stored in the histogram holding section 5. Operational process steps in the histogram creating section 4 are shown in FIG. 5, and are discussed later.

Figure 7:
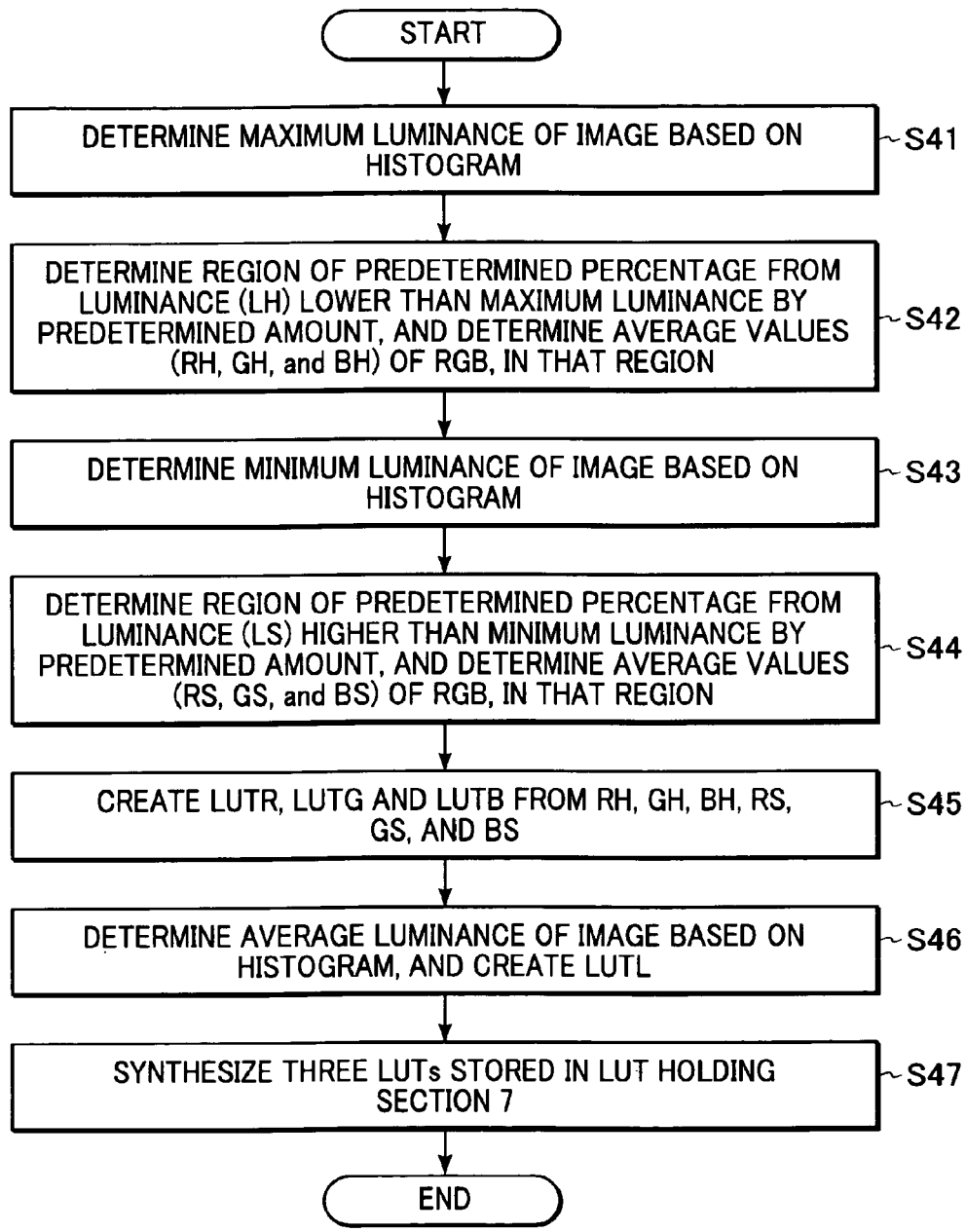
FIG. 7 is a flowchart showing operational process steps associated with a lookup table creating section 6 in the first embodiment.

At step 22, in the lookup table creating section 6, a lookup table is created. Operational process steps in the lookup table creating section 6 are shown in FIG. 7, and are discussed later.

Figure 12:
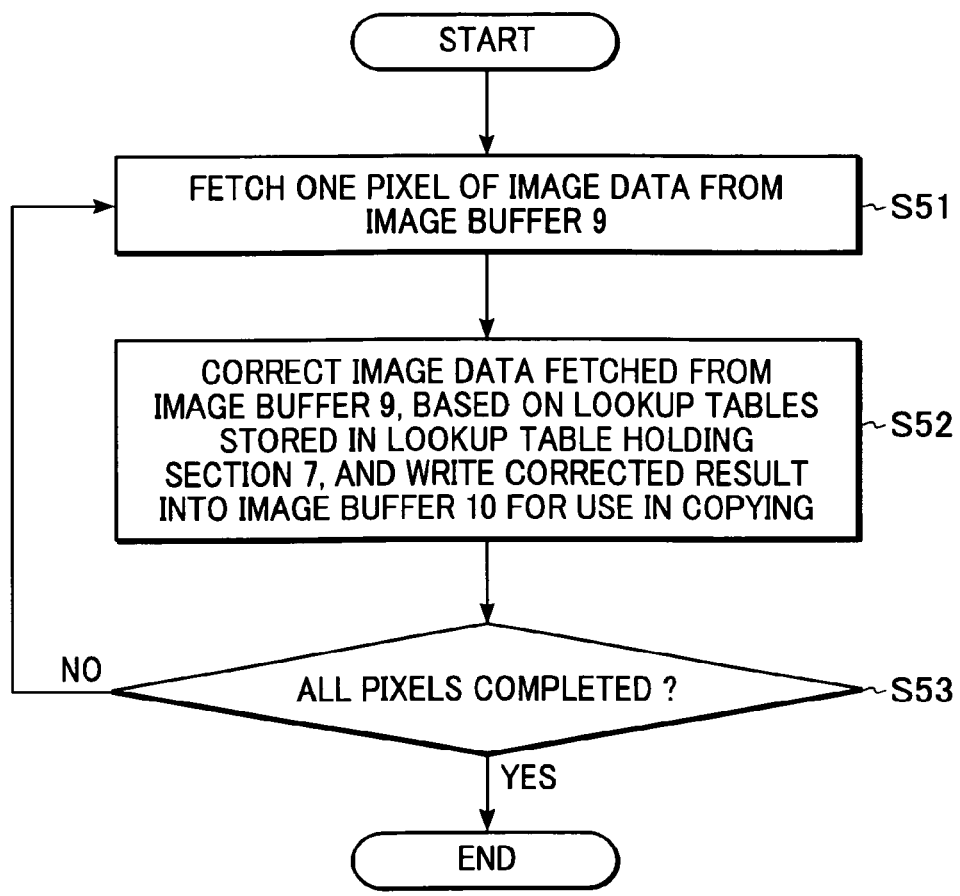
FIG. 12 is a flowchart showing operational process steps in an image correcting section 8 in the first embodiment.

At step 23, in the image correcting section 8, the image is corrected. Operational process steps in the image correcting section 8 are shown in FIG. 12, and are discussed later.

Operations in Histogram Creating Section 4

FIG. 5 shows operational process steps in the histogram creating section 4. These are more specific descriptions of step S21 shown in FIG. 4.

At step 31, one pixel of image data is fetched one after another from the image buffer 9. The luminance (R, G, and B values) of respective R(red), G(green), and B(blue) colors are then stored as image data. At step S32, from R, G, and B luminance values of the image data, the luminance L of the pertinent pixel is determined by the following expression.

$$L=(3*R+6*G+1*B)/10$$

At step S33, the histogram stored in the histogram holding section 5 is updated. The histogram holding section 5 holds a histogram HistL having the luminance L, calculated above, and HistR, HistG, and HistB that store the cumulative luminance values of respective R, G, and B colors by luminance L of the pertinent pixel. Any initial state is 0. The following expressions are used to perform histogram updates.

$$HistR[L]=HistR[L]+R$$

$$HistG[L]=HistG[L]+G$$

$$HistB[L]=HistB[L]+B$$

$$HistL[L]=HistL[L]+1$$

At step S34, it is checked whether all pixels have been completed. Otherwise, the processing advances to step S31. Here, a histogram may be created by using color information about some pixels sampled at an appropriate pitch from all pixels, instead of using color information about all pixels.

Figure 6:
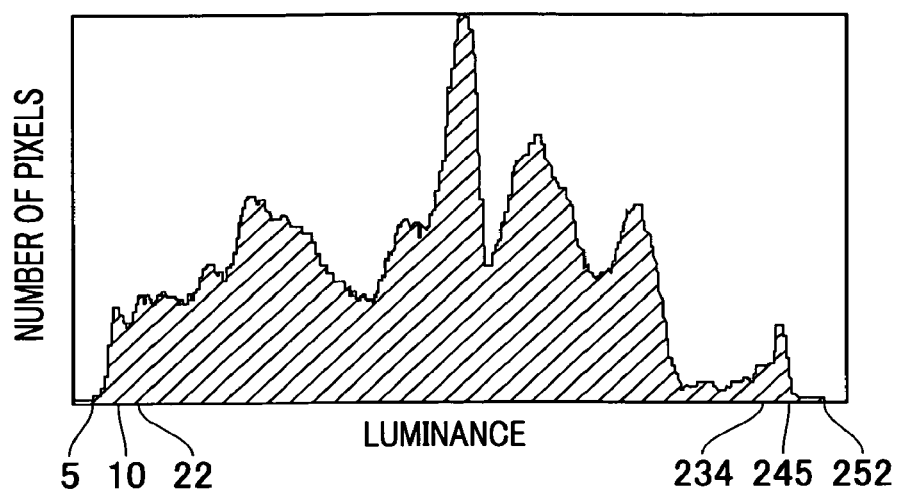
FIG. 6 is a representation of an example of a histogram in the first embodiment.

FIG. 6 shows an example of a histogram HistL.

Figure 21:
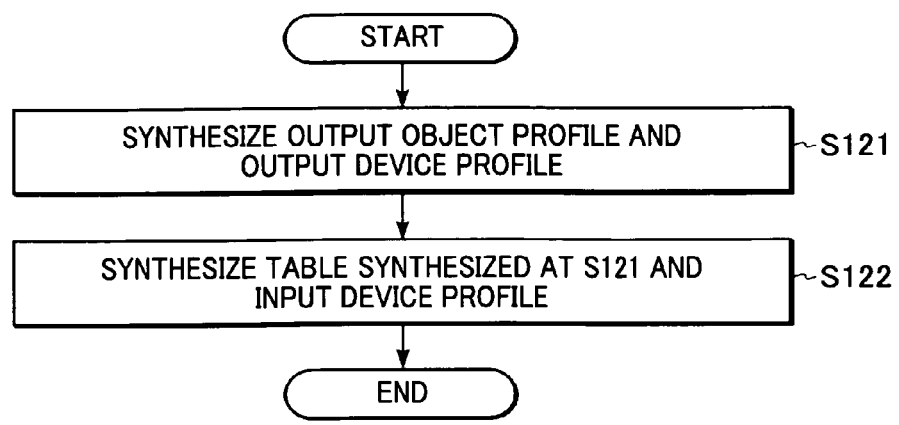
FIG. 21 is a flowchart showing a method for synthesizing a lookup table for correcting gradation reproducibility and color reproducibility in the first embodiment.

Method for Creating Lookup Table for Correcting Gradation Reproducibility and Color Reproducibility The lookup table for correcting gradation reproducibility and color reproducibility refers to a lookup table that, with a view toward achieving a desirable color reproduction, performs an image correction such that the gradation reproduction and color reproduction on printed matter when an image inputted from an input device such as a digital camera is outputted by an output device such as a printer, is brought near to the gradation reproduction and color reproduction implemented by an output object such as a silver salt positive film. A method for creating a lookup table for correcting gradation reproducibility and color reproducibility is explained with reference to FIG. 21.

Figure 9:
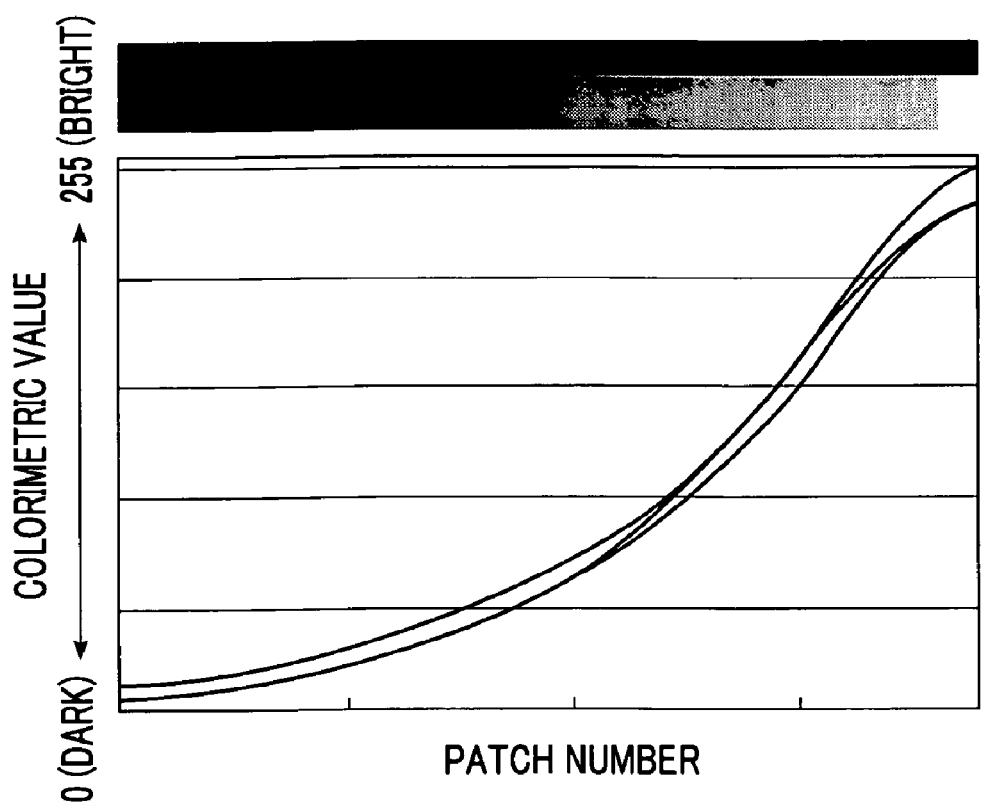
FIG. 9 is a diagram showing an example of an output object profile in the first embodiment.
Figure 11:
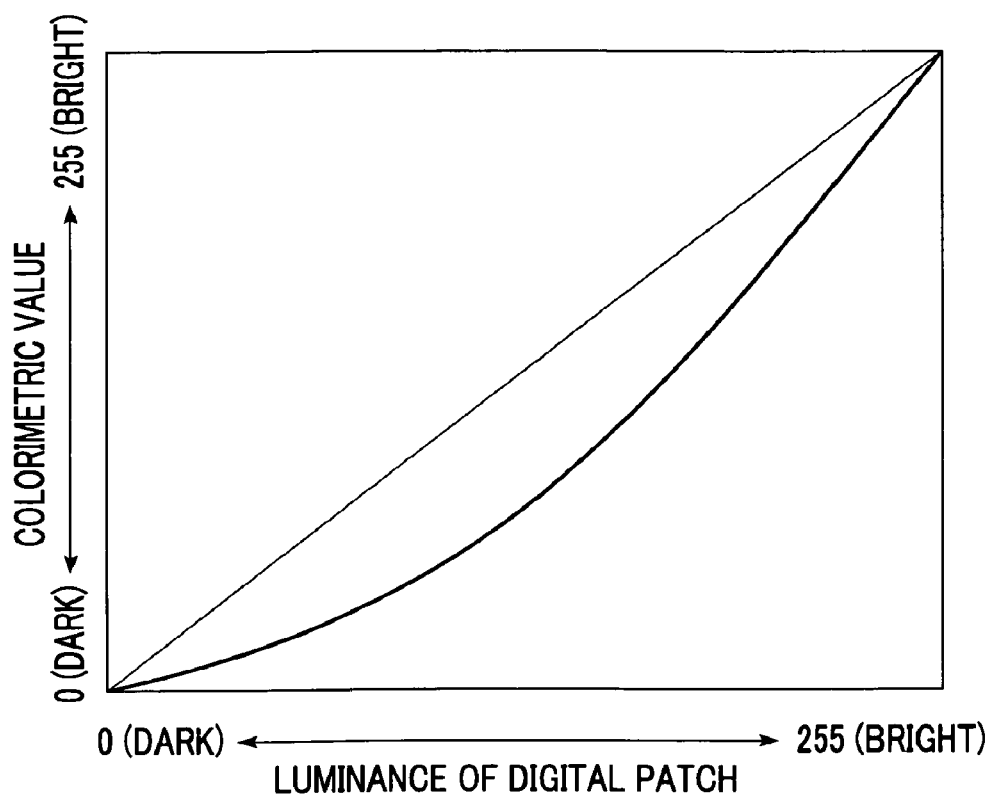
FIG. 11 is a diagram showing an example of an output device profile in the first embodiment.

At step S121, an output object profile (the relationship between the patch number and the XYZ calorimetric value) shown in FIG. 9, and an output device profile (the relationship between the XYZ colorimetric values and the R, G, and B luminances) shown in FIG. 11 are synthesized. The synthesis method is firstly to search for the patch having the same Y value as the Y value of the XYZ values (a value is provided every patch) of the output object profile out of the output device profile. Then, the R, G, and B values corresponding to the XYZ values of the patch searched from the output device profile, and the patch number of the original output object profile are brought into correspondence with each other, and they are synthesized. The synthesized table represents the relationship between the patch number and the luminances (R, G, and B values) of the output device.

Figure 10:
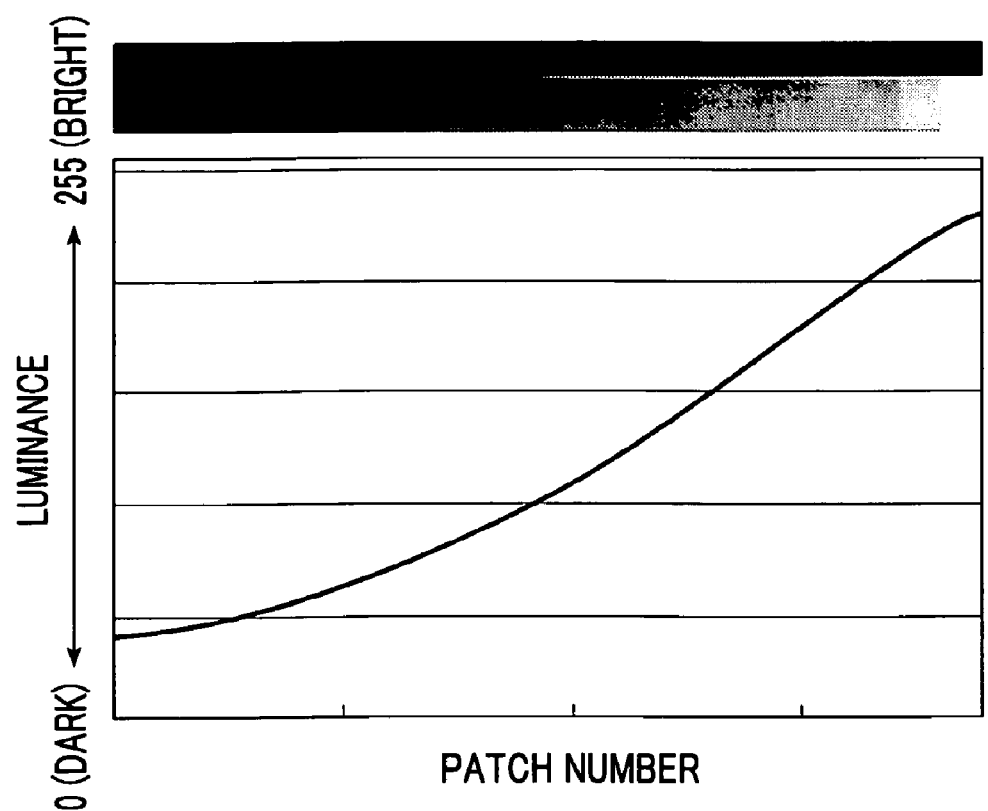
FIG. 10 is a diagram showing an example of an input device profile in the first embodiment.

At step S122, the synthesized table in step S121 and an input device profile shown in FIG. 10 are synthesized. Because the input device profile represents the relationship between the patch number and the luminances (R, G, and B values) of the input device, the synthesis method is to acquire the relationship between the luminances (R, G and B values) of the input device and those of the output device corresponding to the identical patch number. The created table is stored in the lookup table holding section 7, and is used when correcting the image. An example of how it is actually used is described later.

Figure 22:
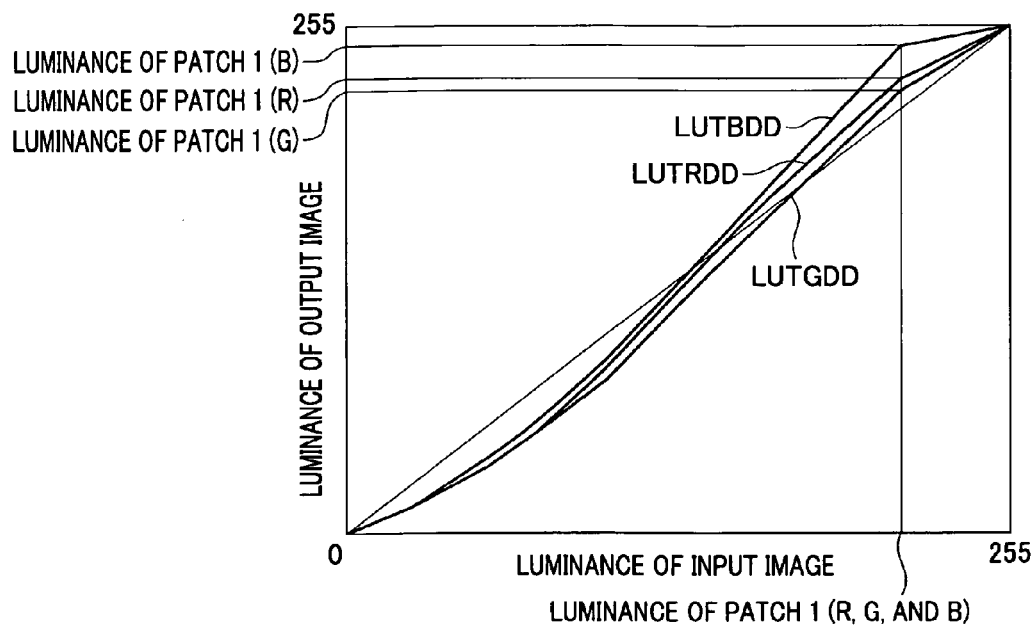
FIG. 22 is a diagram showing examples of the synthesized lookup tables for correcting gradation reproducibility and color reproducibility in the first embodiment.

Examples of Lookup Tables for Correcting Gradation Characteristic and Color Reproducibility Lookup tables shown in FIG. 22 are lookup tables LUTRDD, LUTGDD, and LUTBDD for correcting gradation characteristic and color reproducibility that have been created by the above-described method. Intermediate points that are not stored in the table are interpolated by a straight line, and thereby conversion data is created. Points in the vicinity of the opposite ends are interpolated using straight lines between respective points (255, 255) and (0, 0). In this embodiment, linear interpolation is used as interpolation processing. Alternatively, for example, nonlinear interpolation processing employing, for example, a spline curve or a Bezier curve may be used.

Operations in Lookup Table Creating Section 6

Operational process steps in the lookup table creating section 6 are shown in FIG. 7. These are more specific descriptions about step S22 shown in FIG. 4.

At step S41, the maximum luminance of the image is determined from the histogram HistL stored in the histogram holding section 5. In the histogram shown in FIG. 6, the maximum luminance is 252.

At step S42, the maximum luminance determined at step S41, and a numeral value 255 are each decremented by a predetermined amount (in FIG. 6, the predetermined amount=10), and the luminance LH' when the maximum luminance becomes larger than the numeral value is determined. More specifically, in this instance, the numerical value starts at 255 and decrements in the manner 245, 235, 225, . . . , and the numerical value is compared with the maximum luminance every time the numerical value is decremented (in FIG. 6, LH' ultimately becomes 245). Then, a region including pixels of a predetermined percentage (in FIG. 6, 1% of the number of all pixels) is determined. The minimum luminance of this region is assumed as a highlight point LH (in FIG. 6, LH=234). Then, average luminances (RH, GH, and BH) of R, G, and B colors within this region (the region where the luminance thereof is in a range of LH to LH', both inclusive, is calculated by the following expressions.

$$RH = \sum_{m=LH}^{LH'} HistR[m] \bigg/ \sum_{m=LH}^{LH'} HistL[m]$$

$$GH = \sum_{m=LH}^{LH'} HistG[m] \bigg/ \sum_{m=LH}^{LH'} HistL[m]$$

$$BH = \sum_{m=LH}^{LH'} HistB[m] \bigg/ \sum_{m=LH}^{LH'} HistL[m]$$

At step S43, the minimum luminance of the image is determined from the histogram HistL stored in the histogram holding section 5. In the histogram shown in FIG. 6, the minimum luminance is 6.

At step S44, the minimum luminance determined at step S43, and a numeral value 0 are each incremented by a predetermined amount (in FIG. 6, the predetermined amount=10), and the luminance LS' when the minimum luminance becomes smaller than the numeral value is determined (in FIG. 6, LS' ultimately becomes 10). Then, a region including pixels of a predetermined percentage (in FIG. 6, 1% of the number of all pixels) is determined. The maximum luminance of this region is assumed as a shadow point LS (in FIG. 6, LS=22). Then, the average luminances (RS, GS, and BS) of R, G, and B colors within this region (the region where the luminance is in a range of LS' to LS, both inclusive, is calculated by the following expressions.

$$RS = \sum_{m=LS'}^{LS} HistR[m] \bigg/ \sum_{m=LS'}^{LS} HistL[m]$$

$$GS = \sum_{m=LS'}^{LS} HistG[m] \bigg/ \sum_{m=LS'}^{LS} HistL[m]$$

$$BS = \sum_{m=LS'}^{LS} HistB[m] \bigg/ \sum_{m=LS'}^{LS} HistL[m]$$

Figure 8A:
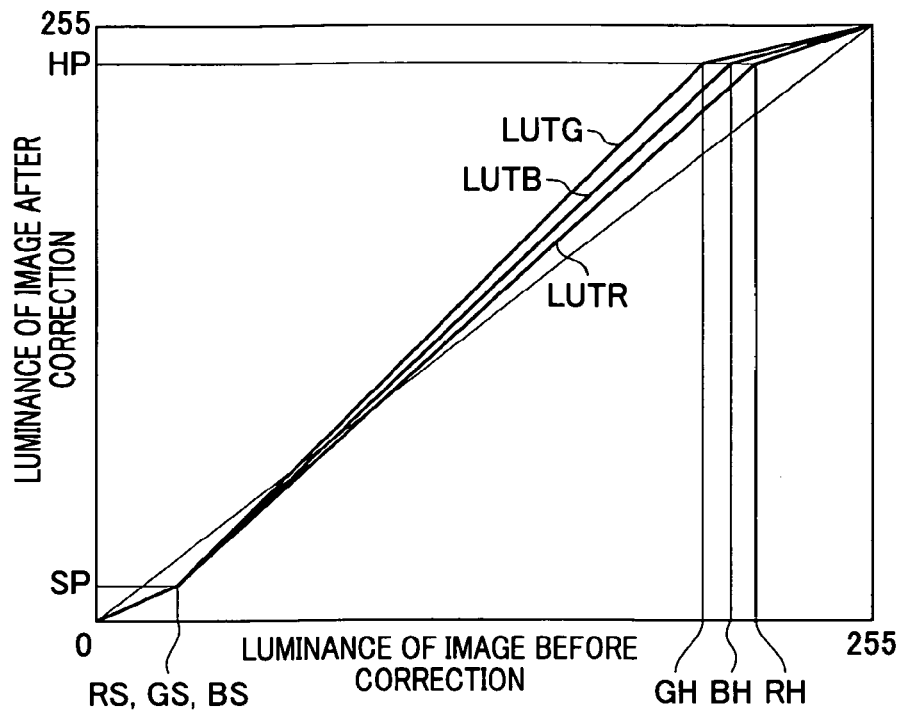
FIGS. 8A and 8B are diagrams showing examples of lookup tables held in a lookup table holding section 7 in the first embodiment.
Figure 8B:
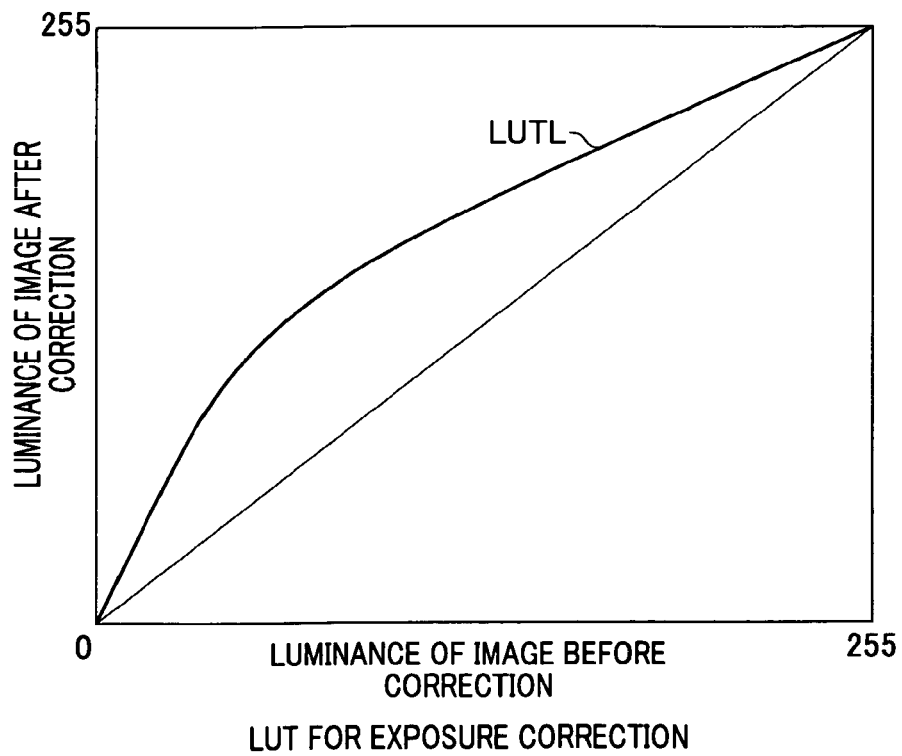

At step S45, lookup tables LUTR, LUTG, and LUTB corresponding to R, G, and B colors, respectively, are created from the determined RH, GH, BH, RS, GS, and BS. FIG. 8A shows examples of the created lookup tables. A more detailed description thereof is given later. Then, at step S46, the average luminance of the image is determined from the Histogram HistL stored in the histogram holding section 5. A lookup table LUTL for exposure correction is created based on the determined average luminance value. FIG. 8B shows an example of a created lookup table. A more detailed description thereof is made later.

At step S47, the lookup tables LUTR, LUTG, and LUTB; LUTL created in step S46; and the lookup tables LUTRDD, LUTGDD, and LUTBDD stored in advance in the lookup table holding section 7 for correcting gradation characteristic and color reproducibility, are synthesized according to the following expressions. The synthesized lookup tables LUTR2, LUTG2, and LUTB2 are stored in the lookup table holding section 7.

$LUTR2[i]=LUTRDD[LUTL[LUTR[i]]]$ $LUTG2[i]=LUTGDD[LUTL[LUTG[i]]]$ $LUTB2[i]=LUTBDD[LUTL[LUTB[i]]]$

Here, "i" is a value in a range of 0 to the maximum luminance, both inclusive.

Examples of Created Lookup Tables

FIGS. 8A and 8B show examples of the created LUTR, LUTG, LUTB, and LUTL. The lookup tables LUTR, LUTG, and LUTB shown in FIG. 8A are used for correcting contrast and color fogging. Here, gamma (γ) values (described later) of G, B, and R highlights are increased in this order. By enhancing G and B relative to R in this manner, for example, red fog on an image can be corrected. Concurrently, the correction of contrast is also achievable.

On the other hand, the lookup table LUTL shown in FIG. 8B is one for exposure correction, and is created in accordance with the average luminance of an image. Specifically, when the average luminance is low, there is a high probability of the image being underexposed, and therefore, a table such as to make an overall image brighter is created. Conversely, when the average luminance is high, there is a high probability of the image being overexposed, and therefore, a table such as to make an overall image darker is created.

Operations in Image Correcting Section 8

FIG. 12 shows operational process steps in the image correcting section 8. These are more specific descriptions of step S23 shown in FIG. 4 and step S73 shown in FIG. 14. At step S51, one pixel of image data stored in the image buffer 9 is fetched. As image data, luminances (R, G, and B) of RGB colors are stored.

At step S52, based on the lookup tables LUTR2, LUTG2, and LUTB2 that have been synthesized at step S47 or step S99, the image data fetched from the image buffer 9 is corrected. The corrected result is stored in the image buffer 10 for use in copying.

$R=LUTR2[R], G=LUTG2[G], B=LUTB[B]$

At step S53, it is checked whether all pixels have been completed. If so, the proceeding is finished. Otherwise, the processing advances to step S51.

In this embodiment, in order to speed up creation processing of lookup tables and image correction processing, lookup tables are prepared for each color component.

Operations in Face Detection Processing Section 12

Figure 24A:
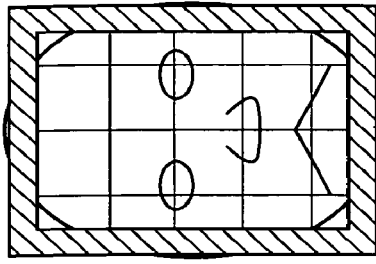
FIGS. 24A to 24C are representations of a processing flow of face detection.
Figure 24B:
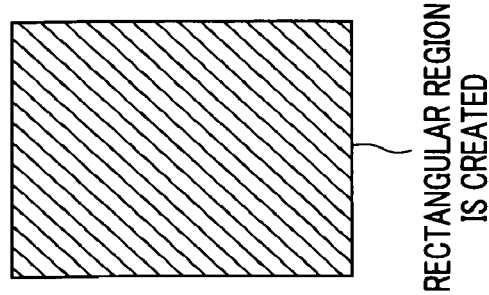
Figure 24C:
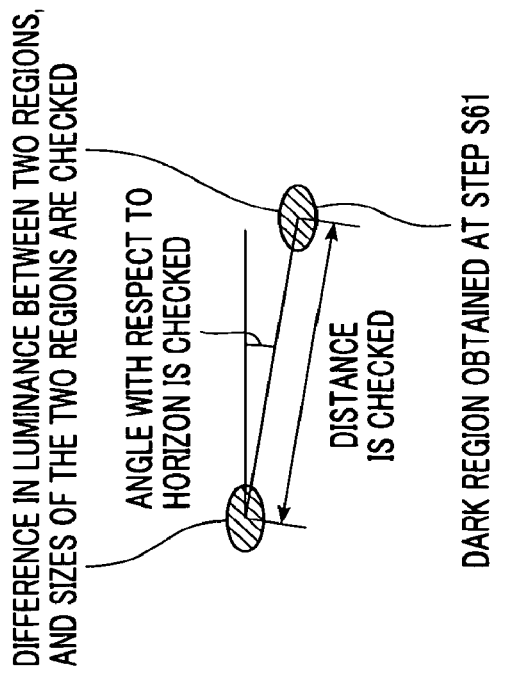

FIGS. 13 and 24 show operational process steps in the face detection processing section 12. These are more specific descriptions of step S3 shown in FIG. 2.

At step S61, based on the image data stored in the image buffer 9 or image buffer 10 for use in copying (for the latter, the image data is corrected in step S2), regions where the luminance is locally low are marked one after another.

At step S62, the regions marked in step 61 are paired, and it is determined whether the marked pair are eyes, based on the equality of the sizes of the paired regions, difference in luminance therebetween, angle that they form with respect to the horizon (see FIG. 24A).

At step S63, with respect to the paired regions determined to be eyes, a rectangular region around the pair regions is set. Then, an edge in the vicinity of the boundary of the rectangular region and color information about the inside of the rectangular region are determined. The edge is used for determining the profile of a face. The color information is used for determining whether the average values of the R, G, and B values of the rectangular region is within a preset skin color region. In this manner, the face region is determined by detecting the position and size of a face. The face region is given by the above-described rectangular region, which is an oblong region of which the opposite horizontal and vertical sides are each parallel to each other (see FIG. 24B (C)).

At step S64, a mask data such as to mask the determined face region is created, and the created mask data is stored in the image buffer 9. This mask data is information for allowing the face region to be identified.

Image Correction Processing When Using Mask Data

FIG. 14 shows a flow of image correction processing when using mask data in this embodiment.

Figure 15:
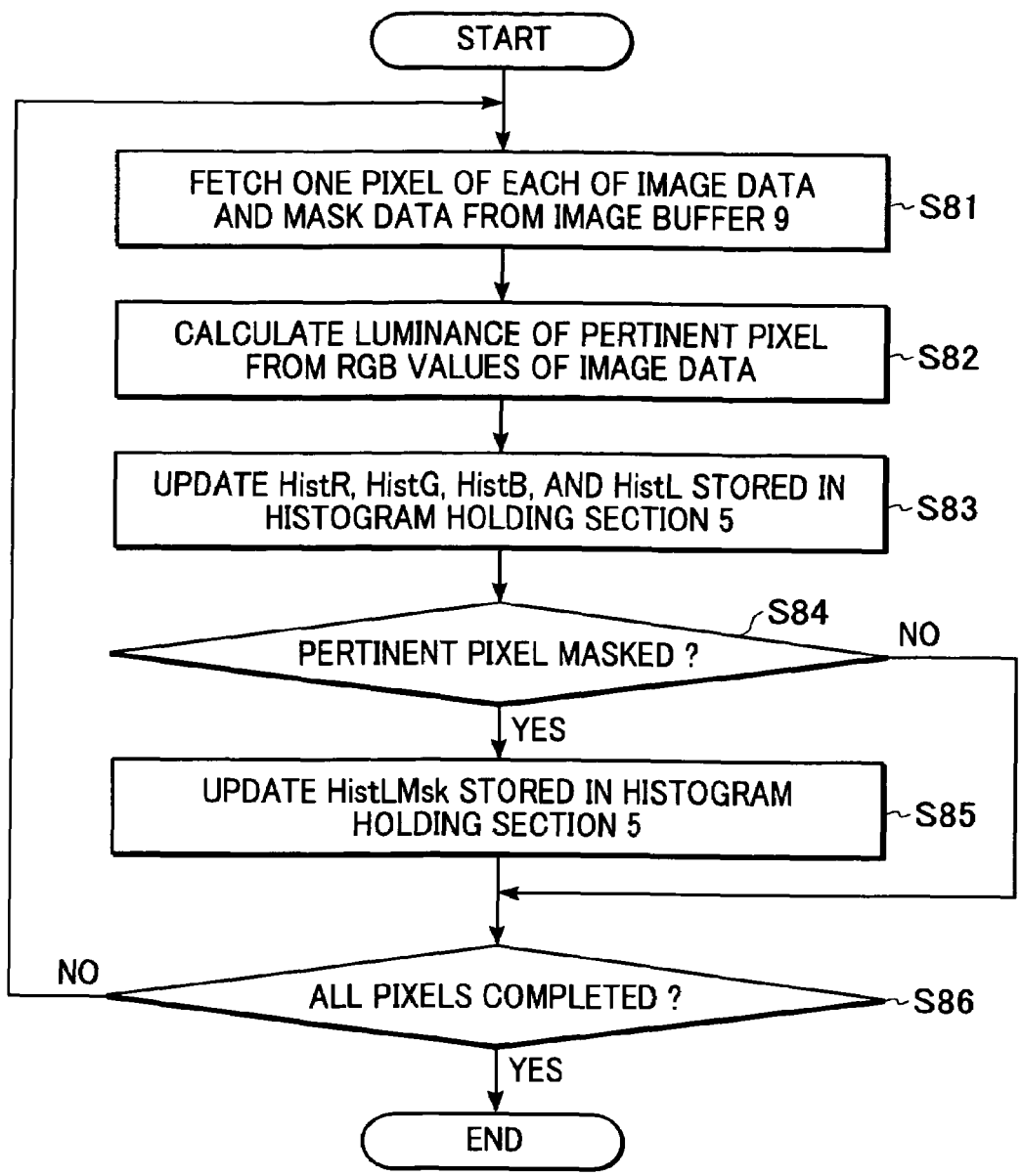
FIG. 15 is a flowchart showing operational process steps associated with the histogram creating section 4 when using mask data in the first embodiment.

At step S71, in the histogram creating section 4, a histogram is created based on the image data (the image data before being subjected to the correction in step S2) that has been stored in the image buffer 9, and the created result is stored in the histogram holding section 5. Operational process steps in the histogram creating section 4 are shown in FIG. 15 and are discussed later.

Figure 16:
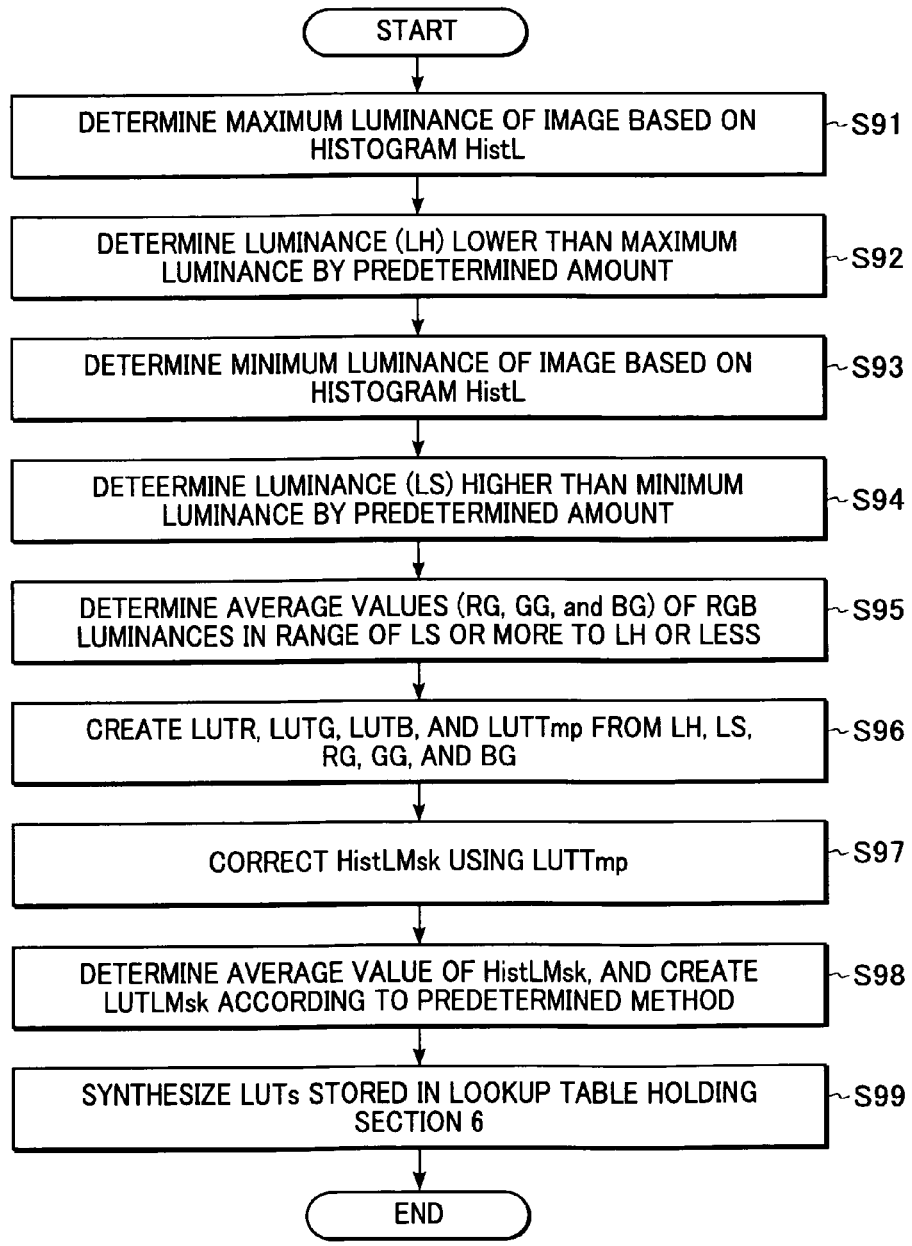
FIG. 16 is a flowchart showing operational process steps in the lookup table creating section 6 when using mask data in the first embodiment.

At step S72, in the lookup table creating section 6, a lookup table is created. Operational process steps in the lookup table creating section 6 are shown in FIG. 16, and are discussed later.

At step S73, in the image correcting section 8, the image is corrected. Operational process steps in the image correcting section 8 are shown in FIG. 12 in a more detail.

Histogram Creation Processing When Using Mask Data

FIG. 15 shows operational process steps in the histogram creating section 4. These are more specific descriptions of step S71 shown in FIG. 14.

At step 81, one pixel of image data and mask data are each fetched one after another from the image buffer 9.

At step S82, from the R, G, and B values of the image data, the luminance L of a pertinent pixel is determined by the following expression.

$L=(3*R+6*G+1*B)/10$

At step S83, the histogram stored in the histogram holding section 5 is updated. The histogram holding section 5 holds a histogram HistL having the luminance L above calculated; HistR, HistG, and HistB that store the cumulative luminance values of respective R, G, and B colors by luminance L of the pertinent pixel; and a histogram HistLMsk having a luminance L, for a region masked by mask data. Any initial state is 0. The updating of histograms is performed by the following expressions.

$HistR[L]=HistR[L]+R$ $HistG[L]=HistG[L]+G$ $HistB[L]=HistB[L]+B$ $HistL[L]=HistL[L]+1$ At step S84, it is checked, based on the mask data, whether the pertinent pixel is masked. If so, the processing advances to step S85. Otherwise, the processing advances to step S86.

At step S85, a mask region histogram stored in the histogram holding section 5 for calculating the exposure state of the mask region, is updated.

$HistLMsk[L]=HistLMsk[L]+1$

At step S86, it is checked whether all pixels have been completed. If so, the processing is finished. Otherwise, the processing advances to step S81.

Operations in Lookup Table Creating Section 6 When Using Mask Data

FIG. 16 shows operations in lookup table creating section 6 when using mask data. These are more specific descriptions of step S72 shown in FIG. 14.

At step S91, the maximum luminance of the image is determined from the histogram HistL stored in the histogram holding section 5.

At step S92, the maximum luminance determined at step S91, and a numeral value 255 are each decremented by a predetermined amount, and the luminance LH' when the maximum luminance becomes larger than the numeral value is determined. Then, a region including pixels of a predetermined percentage is determined. The minimum luminance of this region is assumed as a highlight point LH.

At step S93, the minimum luminance of the image is determined from the histogram HistL stored in the histogram holding section 5.

The processing steps S91 to 93 are substantially the same as the processing steps S41 to S43 shown in FIG. 7.

At step S94, the minimum luminance determined at step S93, and a numeral value 0 are each incremented by a predetermined amount (in FIG. 6, the predetermined amount=10), and the luminance LS' when the minimum luminance becomes smaller than the numeral value is determined (in FIG. 6, LS' ultimately becomes 10). Then, a region including pixels of a predetermined percentage (in FIG. 6, 1% of the number of all pixels) is determined. The maximum luminance of this region is assumed as a shadow point LS (in FIG. 6, LS=22). Then, at step S95, the average values (RG, GG, and BG) of respective R, G, and B luminances of pixels that are situated within the region where the luminance thereof is in a range of LS to LH, both inclusive, and that meet the following expressions, are determined.

$Max(R, G, B)-Min(R, G, B) \leq Thr$

Here, Max (R, G, B) denotes maximum values of the R, G, and B values, and Min (R, G, B) denotes minimum values thereof, and Thr denotes a threshold value.

Figure 17A:
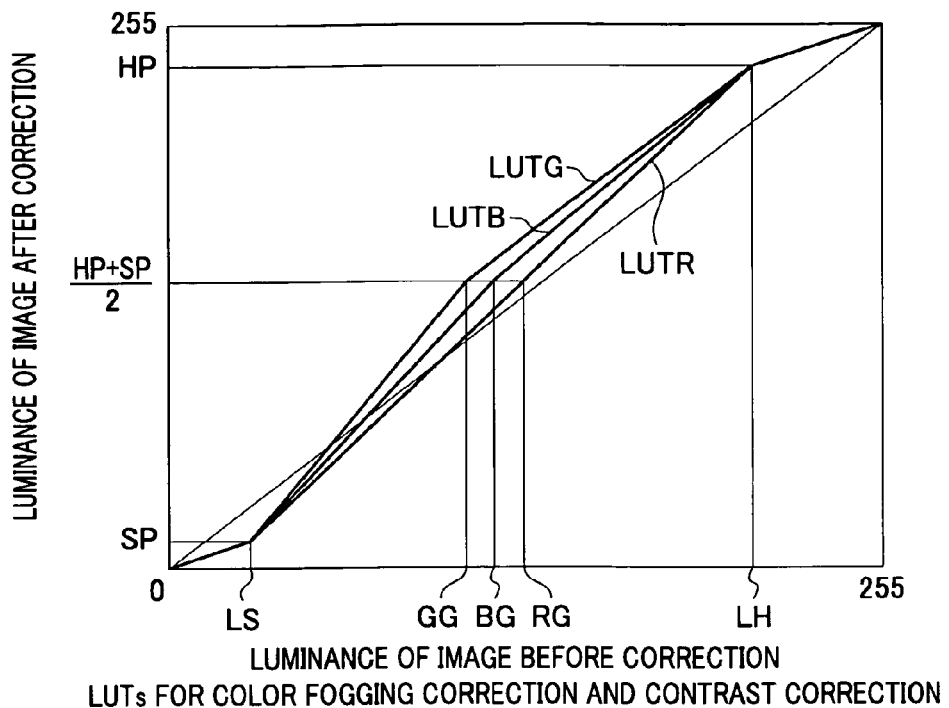
FIGS. 17A and 17B are diagrams showing examples of lookup tables held in the lookup table holding section 7 when using mask data in the first embodiment.

At step S96, lookup tables LUTR, LUTG, and LUTB are created from the LS, LH, RG, GG, and BG that have been determined in step 95. FIG. 17A shows examples of the created lookup tables. A more detailed description thereof is given later. The created results are stored in the lookup table holding section 7. Also, a Lookup table LUTTmp for correcting HistL is created based on LH and LS.

At step S97, HistLMsk is corrected by using the LUTTmp. Thr corrected HistLMsk is used when an exposure correction amount is calculated later.

Figure 17B:
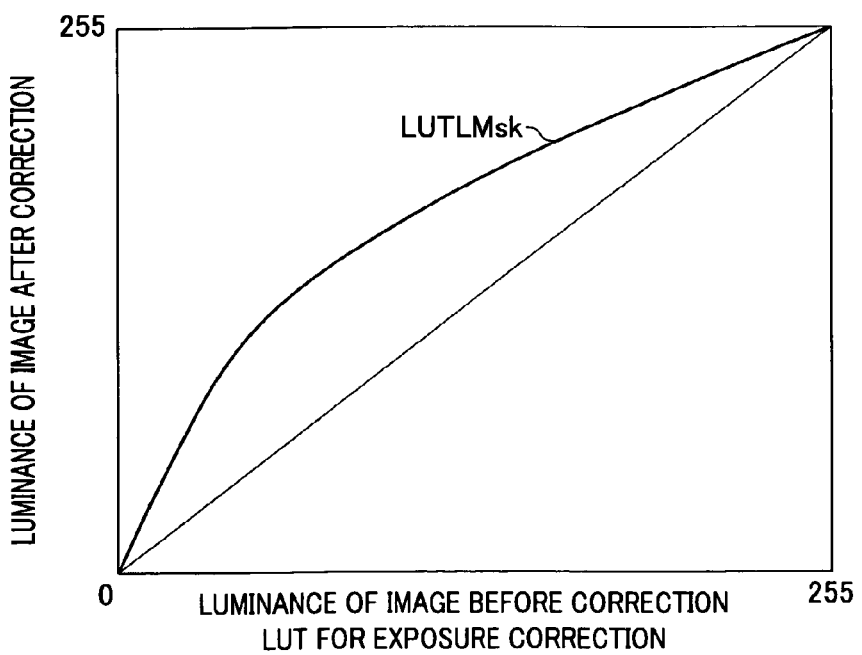

At step S98, the average luminance of the mask region is determined from the HistLMsk after subjected to a correction. Then, a lookup table LUTLMsk for exposure correction is created according to a predetermined method. The created result is stored in the lookup table holding section 7. FIG. 17B shows an example of LUTLMsk. A more detailed description thereof is made later.

At step S99, the lookup tables LUTR, LUTG, LUTB, and LUTLMsk that have been created in step S96 are synthesized by the following expressions. The synthesized lookup tables LUTR2, LUTG2, and LUTB2 are stored in the lookup table holding section 7.

$$LUTR2[i]=LUTLMsk[LUTR[i]]$$

$$LUTG2[i]=LUTLMsk[LUTG[i]]$$

$$LUTB2[i]=LUTLMsk[LUTB[i]]$$

Here, "i" is a value in the range of 0 to the maximum luminance, both inclusive.

Examples of Created Lookup Tables

FIGS. 17A and 17B show examples of the created lookup tables. The lookup tables LUTR, LUTG, and LUTB shown in FIG. 17A are used for correcting color fogging. Here, gamma values of G, B, and R halftones are increased in this order. By enhancing G and B relative to R in this manner, for example, red fog on an image can be corrected. Concurrently, the correction of contrast can also be achieved.

On the other hand, the lookup table shown in FIG. 17B is a lookup table LUTLMsk for optimally correcting an exposure in the mask region. Here, it is also possible to set the region of a person to a mask region, and to set LUTLMsk so that the exposure of the person can be optimally corrected.

Operations in Filter Processing Section 11

FIG. 18 shows operational process steps in the filter processing section 11. These are more specific descriptions of step S6 shown in FIG. 2.

At step S101, enlargement/reduction processing for the image is performed. A method such as a bicubic method or bilinear method is used for this processing.

At step S102, edge enhancement processing is performed. Operational process steps of the edge enhancement processing are shown in FIG. 19, and discussed later.

Edge Enhancement Processing

Figure 19:
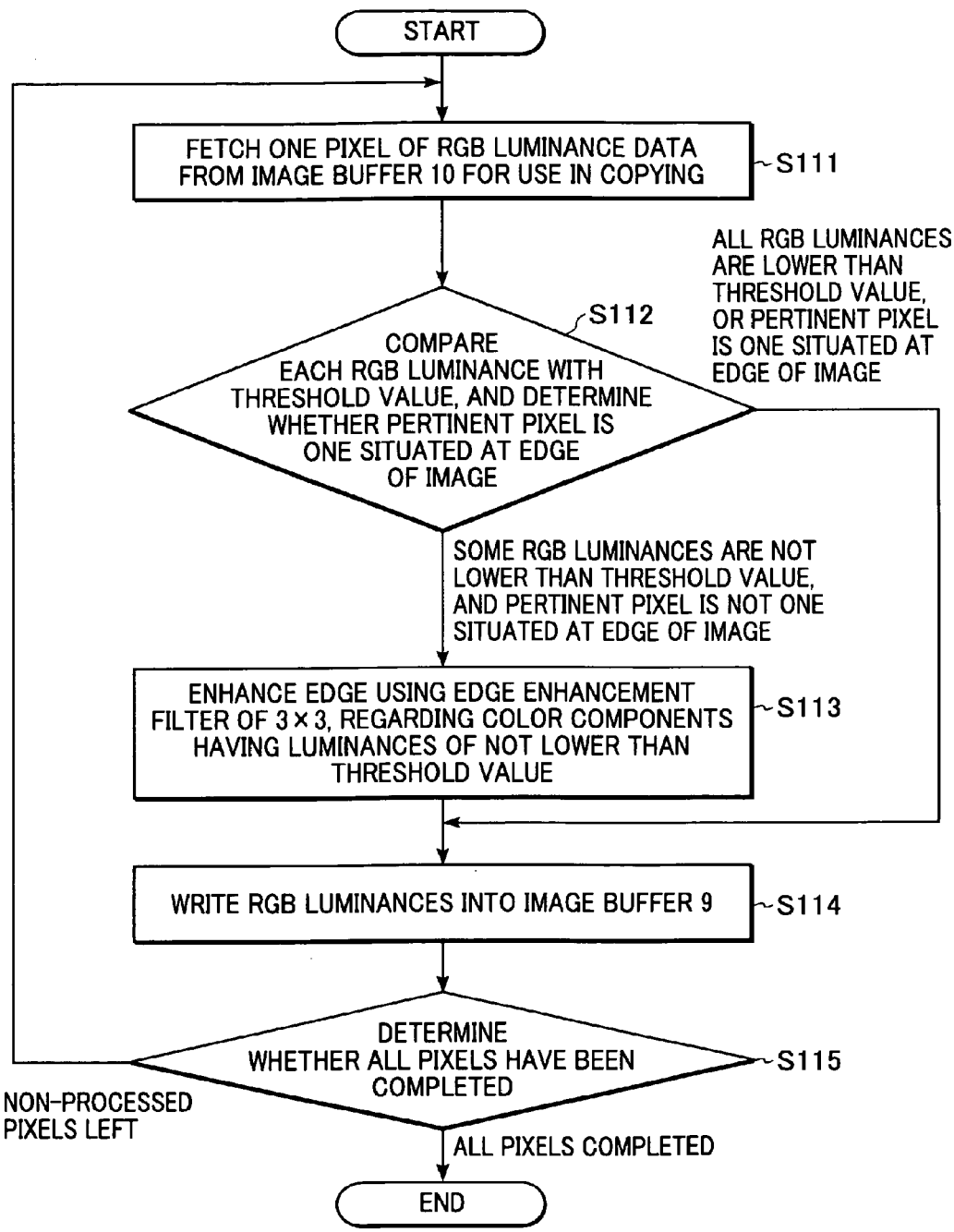
FIG. 19 is a flowchart showing a processing flow of edge enhancement in the first embodiment.

FIG. 19 shows a flow of edge enhancement processing. These are more specific descriptions of step S102 shown in FIG. 18.

First, at step S111, one pixel of R, G, and B luminance data is read from the image buffer 10 for use in copying.

At step S112, the read RGB luminance data and a threshold value are compared, for each of the R, G, and B colors. If all pieces of R, G, and B luminance data are lower than the threshold value, or the pertinent pixel is one situated at an edge, the processing advances to step S114. Otherwise, the processing advances to step S113.

At step S113, with respect to color component data having a luminance value of not lower than the threshold value thereof, a filter processing is performed by using an edge enhancement filter of 3×3. No edge filter processing is performed with respect to color component data having a value lower than the threshold value.

At step S114, the R, G, and B luminance data that has been processed is written into the image buffer 9. When no edge processing is performed, the R, G, and B luminance data that has been read at step S111 is written into the image buffer 9 as it is. At step 115, it is determined whether all pixels have been completed. Otherwise, the processing advances to step S111.

Meanwhile, as the threshold value used in step S112, one and the same threshold value may be used with respect to all color components. Alternatively, the threshold value may be independently set with respect to each of the color components.

According to the first embodiment, it is possible to determine whether the face of a person is included in the input image, and to perform a correction in accordance with the determination result. Therefore, if included, the face of the person can be arranged to be appropriately color-reproduced.

Second Embodiment

In the first embodiment, when creating a lookup table, as a highlight point and shadow point after correction (i.e., HP and SP shown in FIG. 8A), certain constants are always used. However, the use of the information stored in the photographic information holding section 13 allows highlight points and shadow points after correction to be variable. Hereinafter, a second embodiment of the present invention is described.

Figure 25:
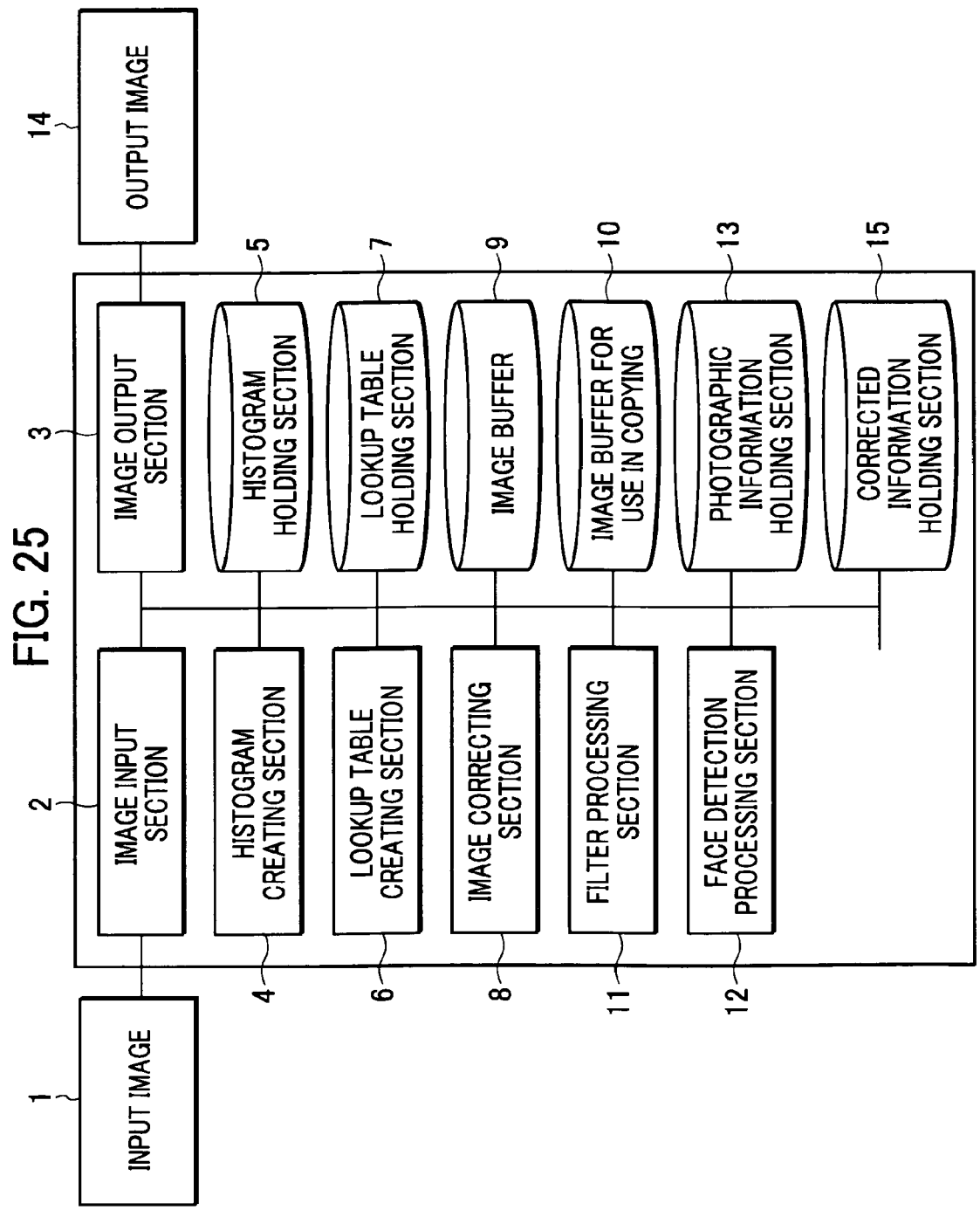
FIG. 25 is a block diagram showing the construction of an image processing device according to a second embodiment of the present invention.

FIG. 25 shows the construction of the main portion of an image processing device according to the second embodiment of the present invention.

Referring to FIG. 25, this image processing device comprises an image input section 2, image output section 3, histogram creating section 4, histogram holding section 5, lookup table creating section 6, lookup table holding section 7, image correcting section 8, imager buffer 9, image buffer 10 for use in copying, filter processing section 11, face detection processing section 12, photographic information holding section 13, and correction information holding section 15.

Other than the lookup table creating section 6 and correction information holding section 15, other features of the present embodiment are similar to those of the above-described embodiment, and are therefore omitted.

Method for Creating Lookup Tables in Second Embodiment

FIG. 26 shows information stored in the correction information holding section 15.

As shown in FIG. 26, two conditions: the usage/non-usage of a flash, and the range of an in-focus position, are combined, and in accordance with the combination of these two conditions, highlight points and shadow points after correction are held. As a result, for example, when a flash is used and the focal length is short, that is, when there is a high probability that a highlight disappears, too much enhancement of contrast can be prevented by reducing the value of HP. Conversely, when no flash is used and a focal length is long, that is, when there is a high probability that the photograph is a scenic one, contrast can be enhanced by increasing the value of HP. These HP and SP are put to use by being read from the correction information holding section 15 when creating lookup tables in the lookup table creating section 6 (i.e., at steps S45 and S96).

Description of Luminance

In the above-described embodiment, digital values from 0 to 255 are used as luminance data. However, for example, the maximum value of the data is not limited to 255. Furthermore, besides luminance, halftone dot density may also be utilized.

Method for Calculating Luminance Values

At steps S32 and S82, the luminance value is determined by weighted average calculation using weights of (R:G:B=3:6:1). However, the calculating method for luminance values is not restricted to this method. For example, weights other than the above-described ones may also be used for weighted average calculation. Furthermore, the luminance may be determined from an average value of the maximum value and minimum value of each of the R, G, and B luminance.

Method for Representing Face Detection Result

In the above-described embodiment, the result of face detection, i.e., a mask region, is represented by a rectangle. However, the mask region is not limited to a rectangle. For example, the result of face detection may be a result obtained by extracting a profile portion. The information allowing the mask region to be identified may be information about the width and height based on the coordinate values of the two opposite points of either one of the two diagonal lines of the rectangle (oblong region), or information about the width and height based on the coordinate values of some of the vertexes of the rectangle (oblong region). Moreover, besides rectangle, the information allowing the mask region to be identified may be a circular region (or elliptical region) nearer to a human face. In this case, the information allowing the mask region to be identified is the central coordinate values and the length of the radius of the circular region, or the central coordinate values and the length of the diameter thereof, or four vortexes of a rectangle circumscribing the circular region or the elliptical region. Moreover, the mask region may be a polygonal region representing the shape of a human face. In this case, information allowing the polygonal region to be identified is the coordinates of all vortexes thereof.

Posture of Camera During Photographing, and Image Data Stored in Image Buffer

In FIG. 23, the postures of camera during photographing and image data stored in the image buffer are each illustrated for four different cases. However, the postures of camera and image data stored in the image buffer are not restricted to these four kinds. For example, when photographing with a camera inclined by 45°, the image may be stored in the image buffer with the image inclined by 45° in the inverse direction.

Method for Utilizing Image Information

In the above-described embodiment, as photographic information, only postures of a camera are used. However, as shown in FIG. 20, the output object profile shown in FIG. 9 may be switched by using an input device ID such as a camera. Also, when attempting to create LUTL for exposure correction, it may be created based on an in-focus position by using an in-focus position.

Regarding Information Held in Correction Information Holding Section 15

In the above-described second embodiment, highlight points (HPs) and shadow points (SPs) after correction are held in the correction information holding section 15. However, information to be held in the correction information holding section 15 is not limited to HPs and SPs alone. For example, methods for exposure correction may also be held. As a consequence, when no flash is used and focal length is long, that is, when there is a high probability of an image being underexposed, the exposure correction can be set so as to make the brightness of an image a little higher than in normal cases for optimizing the exposure of the image.

Third Embodiment

A third embodiment of the present invention will be now described. The descriptions hereinafter are made of only different parts of the this embodiment from those in the first and second embodiments. In the first and second embodiments, the average luminance of a face region is calculated, and lookup tables are created based on predetermined conversion tables. However, in this embodiment, another system for creating lookup tables for exposure is explained.

In general, the desirable brightness of a face is regarded as approximately 60 to 80% of the maximum luminance. In the input image, when the average luminance of a detected face region is not within this range (the range of an ideal color), by performing a correction such as to bring the average luminance near to this range, a correction such as to convert the input image into desirable color information (i.e., correction such as to reproduce a desirable human skin color) can be achieved. In the descriptions hereinafter, the desirable brightness of a face is treated as approximately 60 to 80% of the maximum luminance. However, this value is merely an example. Other values may also be adopted.

Figure 27:
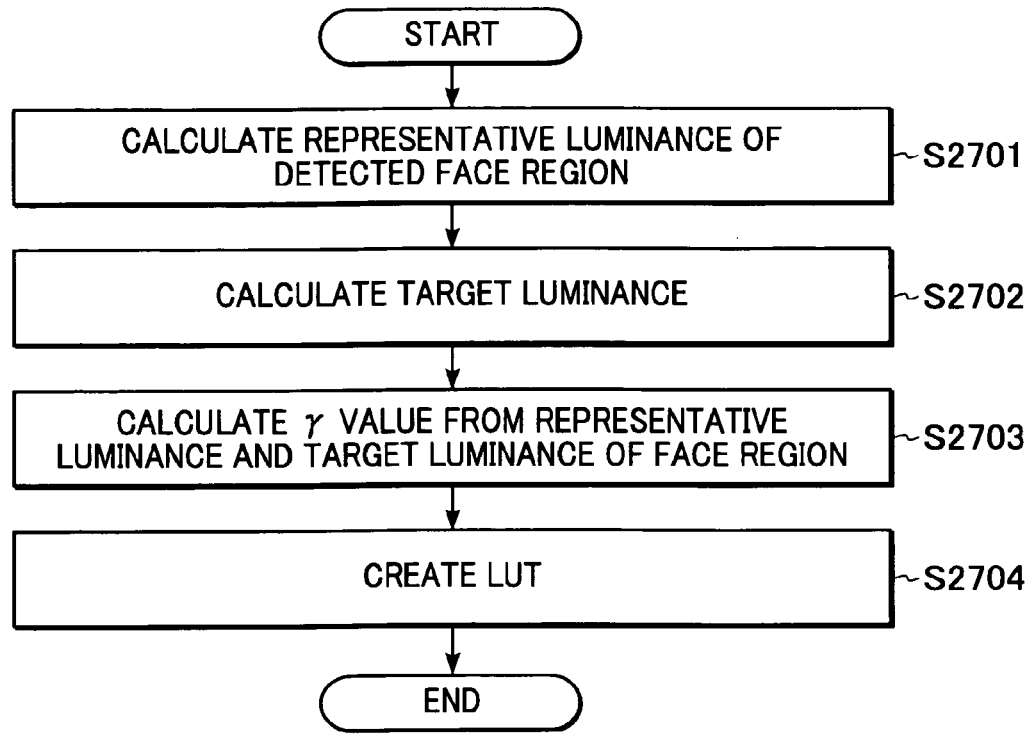
FIG. 27 is a flowchart showing a processing flow of creation of lookup table for exposure correction in a third embodiment of the present invention.

FIG. 27 is a flowchart showing a processing flow of the creation of the lookup table for exposure correction. First, at step S2701, a representative luminance (representative color information) of the detected face region is calculated. In this embodiment, as the representative luminance, average pixel value (average luminance) of the luminance values of pixels included in the face region, are used. Therefore, in the same manner as in the first and second embodiments, the average luminance Lface of a mask region corresponding to the face region is determined, and this average luminance Lface is assumed as the representative luminance of the face region.

A possible modified method for determining the representative luminance is to determine a central value or mode value out of the histogram HistLMsk in a mask region that is the same as the one described in the first embodiment, and to assume this value as the representative luminance Lface. By establishing an arrangement such that, through a user interface of the present device, the user can specify which to select as the representative luminance from among the central value, mode value, and average value, a color correction to suit preference of the user can be implemented.

At the next step S2702, a target luminance Ltarget is calculated. The target luminance Ltarget is calculated using the following expression (1).

$$Ltarget = Lface + (LidealMin - Lface)/A$$
$$(Lface \leq LidealMin)$$

$$Ltarget = Lface \ (LidealMin \leq Lface \leq LidealMax)$$

$$Ltarget = Lface - (Lface - LidealMax)/A$$
$$(LidealMax \leq Lface) \quad \text{Expression (1)}$$

In the above expressions, LidealMin and LidealMax, respectively, are an upper limit value and lower limit value of the desirable luminance range of a face. In this embodiment, the LidealMin and LidealMax values, respectively, are predetermined to be 60% of the maximum luminance (i.e., 255×0.6=153) and 80% thereof (i.e., 255×0.8=204). "A" is a parameter for controlling a correction amount, and is a number of not less than 1. In the present experiments, satisfactory results were obtained by setting "A" to be on the order of 2 to 4.

Performing a correction such as to bring the above-described representative luminance (color information) of a mask region near to the ideal color range, comprises the following steps: (1) out of the color information value (defined as C1) of the representative color in the region calculated from all or some of the mask region, and color information values included in the ideal color range, determining a color information value (defined as C2) that is situated at the shortest distance from the color information value C1 of the representative color in a color space defining the above-described color information; (2) determining a color information value (defined as C3) that internally divides the line connecting the color information values C1 and C2; and thereby, (3) correcting the input image so that the color information value C1 becomes the color information value C3. Here, the internal ratio used is a predetermined value.

Figure 28:
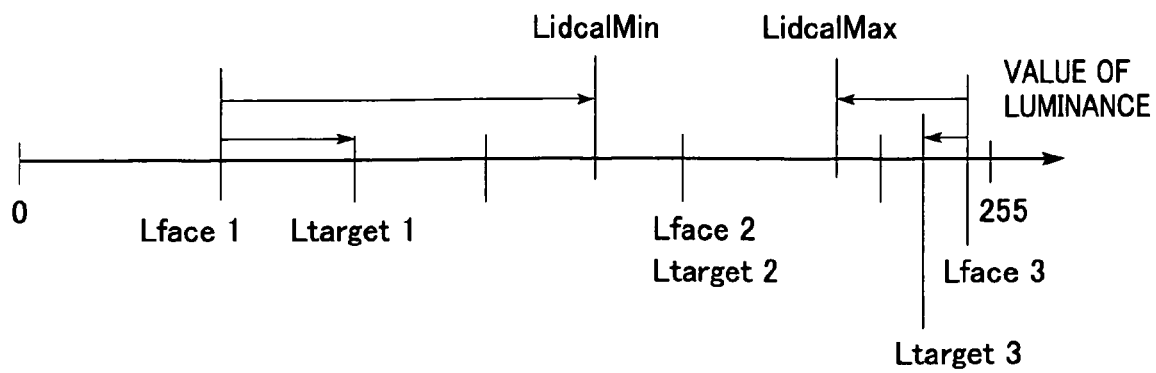
FIG. 28 is a diagram showing the relationship among the representative luminance, the target luminance, and the desirable luminance range of a face in the third embodiment.

FIG. 28 is a diagram showing the relationship among the representative luminance, target luminance, and desirable luminance range of a face. In FIG. 28, the value of "A" is set to 3. Lface 1 and Ltarget 1 are examples in which the respective representative luminances are lower than the lower limit of the desirable luminance range of a face; and Lface 2 and Ltarget 2 are examples in which the respective representative luminances are within the desirable luminance range of a face; and Lface 3 and Ltarget 3 are examples in which the respective representative luminances are higher than the higher limit of the desirable luminance range of a face.

At step S2703, the gamma (γ) value is calculated from the representative luminance Lface and target luminance Ltarget of the face region. The γ value is calculated by using the following expressions. First, the expression (2) for γ correction is transformed into the expression (3). Then, in the expression (3), Lface is substituted for x, and Ltarget is substituted for y, and thereby a γ value is determined.

$$y = 255 \times \left(\frac{x}{255}\right)^{\frac{1}{\gamma}} \quad \text{Expression (2)}$$

(Here, x is a value before correction; y is a value after correction; and x and y are each values in the range of 0 to the maximum luminance LMAX, both inclusive.)

$$\gamma = \frac{\log\left(\frac{x}{255}\right)}{\log\left(\frac{y}{255}\right)} \quad \text{Expression (3)}$$

Lastly, at step S2704, the γ value determined in step S2703 is substituted into the expression (2). While varying the value of x from 0 to 255, the value of y corresponding to the value of x is calculated. The calculation results are stored as a lookup table LUTLMsk, in the lookup table holding section 7, as in the case of the first embodiment.

As described above, a correction such as to bring color information near to the desirable color reproduction range is performed. Specifically, in the γ correction curve: y=LMAX× (x/LMAX)$^{1/\gamma}$ (where, 0≦x≦LMAX, and 0≦y≦LMAX), the γ value that passes through (x, y)=(C1, C3) is calculated, and the correction of the input image is performed by using the determined curve.

In the first embodiment, the lookup table for exposure correction, the lookup tables LUTR, LUTG and LUTB for color fogging correction, as well as the calculated lookup tables LUTRDD, LUTGDD, and LUTBDD for color reproducibility correction, are synthesized, and these results are applied to R, G, and B values of pixels of the input image. However, the calculation and synthesis of these lookup tables are not indispensable for the correction system according to this embodiment.

When the calculation and synthesis of these lookup tables are not performed, LUTR2, LUTG2, and LUTB2 of the first embodiment are equal to LUTLMsk.

A modified method for color correction can also be utilized in which pixels of the input image are converted from R, G, and B image data into, for example, YCbCr image data, and after its Y has been subjected to a correction by LUTLMsk, the converted data is again returned to R, G, and B image data. Meanwhile, in the above-described embodiments, the γ correction is used as a luminance correction method, but other luminance correction methods may also be employed.

As described above, according to the correction system of this embodiment, it is possible to perform image correction to match the desirable brightness of a face.

Other Embodiments

The present invention may be applied to either a system comprising a plurality of apparatuses (e.g., a host computer, interface unit, reader, printer, etc.), or an apparatus comprising a single device (e.g., a copying machine, facsimile, etc).

The present invention also incorporates a case where, with a view toward achieving the functions of the above-described embodiments, program codes of software for implementing the functions of the above-described embodiments are supplied to a computer in an apparatus connected to various devices or a system in order to actuate the various devices, and the computer (CPU or MPU) of the system or apparatus is caused to actuate the aforementioned various devices in accordance with the stored program.

In this case, because the program codes themselves realizes the functions of the above-described embodiments, the program codes themselves, and means for supplying the program codes to the computer, for example, a storage medium storing such program codes, constitute the present invention.

The storage medium storing such program codes may be, for example, a floppy® disk, hard disk, optical disk, magneto-optical disk, CD-ROM, magnetic tape, nonvolatile memory card, ROM.

Such program codes are incorporated in the present invention in not only a case where the functions of the above-mentioned embodiment are implemented by the computer executing the supplied program codes, but also in a case where the functions of the above-mentioned embodiment are realized by the program codes cooperating with an operating system (OS) operating on the computer, or other application soft or the like.

Furthermore, the present invention incorporates a case where the supplied program codes are stored in a memory provided for a function expanding board inserted into the computer or a function expanding unit connected to the computer, and thereafter, based on instructions of the program codes, a CPU or the like provided for the function expanding board or function expanding unit executes some or all of the actual processing operations, thereby implementing the functions of the above-described embodiments through these processing operations.

As many apparently widely different embodiments of the present invention can be made without departing from the spirit and scope thereof, it is to be understood that the invention is not limited to the specific embodiments thereof except as defined in the appended claims.

What is claimed is:

1. An image processing device comprising:
   inputting means for inputting an image;
   detecting means for detecting a face region in the input image;
   histogram generating means for generating a first histogram of the entire input image and a second histogram of the detected face region;
   calculating means for calculating a highlight point and a shadow point of the input image from the first histogram of the entire input image;

first generating means for generating a gradation correction for luminance and a gradation correction for each of a plurality of color components based on the highlight point, the shadow point, a target highlight point and a target shadow point;

conversion means for converting the second histogram based on the gradation correction generated for the luminance;

determining means for determining a representative luminance of the detected face region based on the converted second histogram of the detected face region;

second generating means for generating an exposure correction based on the representative luminance; and correcting means for correcting the input image based on the gradation correction generated for each of the plurality of color components and the exposure correction.

2. An image processing method comprising:

inputting an image;

detecting a face region in the input image;

generating a first histogram of the entire input image and a second histogram of the detected face region;

calculating a highlight point and a shadow point of the input image from the first histogram of the entire input image;

generating a gradation correction for luminance and a gradation correction for each of a plurality of color components based on the highlight point, the shadow point, a target highlight point and a target shadow point;

converting the second histogram based on the gradation correction generating for the luminance;

determining a representative luminance of the detected face region based on the converted second histogram of the detected face region;

generating an exposure correction based on the representative luminance; and correcting the input image based on the gradation correction generating for each of the plurality of color components and the exposure correction.

3. The image processing device according to claim 1, further comprising rotating means for rotating the input image in accordance with a posture in a photographic information of the input image.

4. The image processing device according to claim 1, wherein the second generating means calculates a y value based on the representative luminance and a target luminance.

5. A computer-readable storage medium for storing computer-executable process steps of an image processing device comprising:

inputting an image;

detecting a face region in the input image;

generating a first histogram of the entire input image and a second histogram of the detected face region;

calculating a highlight point and a shadow point of the input image from the first histogram of the entire input image;

generating a gradation correction for luminance and a gradation correction for each of a plurality of color components based on the highlight point, the shadow point, a target highlight point and a target shadow point;

converting the second histogram based on the gradation correction generating for the luminance;

determining a representative luminance of the detected face region based on the converted second histogram of the detected face region;

generating an exposure correction based on the representative luminance; and correcting the input image based on the gradation correction generating for each of the plurality of color components and the exposure correction.

* * * * *